(12) United States Patent
Hashimoto

(10) Patent No.: US 12,443,681 B2
(45) Date of Patent: *Oct. 14, 2025

(54) PROCESSING EXECUTION SYSTEM, PROCESSING EXECUTION METHOD, AND PROGRAM

(71) Applicant: RAKUTEN GROUP, INC., Tokyo (JP)

(72) Inventor: Chikara Hashimoto, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/548,337

(22) PCT Filed: Feb. 2, 2022

(86) PCT No.: PCT/JP2022/003988
§ 371 (c)(1),
(2) Date: Aug. 30, 2023

(87) PCT Pub. No.: WO2023/079769
PCT Pub. Date: May 11, 2023

(65) Prior Publication Data
US 2024/0143701 A1    May 2, 2024

(30) Foreign Application Priority Data

Nov. 5, 2021   (WO) .................. PCT/JP2021/040852

(51) Int. Cl.
*G06F 7/00*        (2006.01)
*G06F 16/00*       (2019.01)
(Continued)

(52) U.S. Cl.
CPC ...... *G06F 18/2415* (2023.01); *G06F 16/2455* (2019.01); *G06F 40/30* (2020.01)

(58) Field of Classification Search
None
See application file for complete search history.

(56) References Cited

U.S. PATENT DOCUMENTS

2013/0132311 A1\* 5/2013 Liu ...................... G06V 10/774
  706/12
2017/0193337 A1\* 7/2017 Kriegman ............. G06F 18/254
(Continued)

FOREIGN PATENT DOCUMENTS

| JP | 2017-049681 A | 3/2017 |
| JP | 2018-124914 A | 8/2018 |
| JP | 2020-016960 A | 1/2020 |

OTHER PUBLICATIONS

Kai Sheng Tai, et al., Improved Semantic Representations From Tree-Structured Long Short-Term Memory Networks, arXiv, May 30, 3015, <https://arxiv.org/pdf/1503.00075.pdf>, pp. 1-11.

(Continued)

*Primary Examiner* — Tuan A Pham
(74) *Attorney, Agent, or Firm* — HEA Law PLLC

(57) ABSTRACT

A processing execution system, comprising at least one processor configured to: acquire second classification information relating to a classification of second data based on a first model which has learned a relationship between first data and first classification information relating to a classification of the first data; estimate, based on a predetermined estimation method, a validity relating to a combination of the second data and the second classification information; and execute predetermined processing based on an estimation result for the validity.

16 Claims, 12 Drawing Sheets

(51) Int. Cl.
   *G06F 16/2455*   (2019.01)
   *G06F 18/2415*   (2023.01)
   *G06F 40/30*     (2020.01)

(56) References Cited

U.S. PATENT DOCUMENTS

2018/0060326 A1* 3/2018 Kuo .................... G06F 16/9535
2018/0246953 A1   8/2018 Oh et al.
2021/0056365 A1* 2/2021 Sivan ..................... G06V 20/58
2021/0097502 A1* 4/2021 Hilleli .................... G06N 20/20
2022/0343632 A1* 10/2022 Hattori ................. G06V 10/764

OTHER PUBLICATIONS

International Search Report for PCT/JP2022/003988, dated Apr. 19, 2022, pp. 1-12 (See transmittal letter).
International Search Report for PCT/JP2021/040852, dated Nov. 30, 2021, pp. 1-10 (See transmittal letter).

* cited by examiner

FIG.5

| TITLE | ATTRIBUTE | ATTRIBUTE VALUE |
|---|---|---|
| Computer Graphic Bag Zebra JPG | Image | Computer Graphic |
| Computer Graphic Bag Zebra JPG | Pattern | Zebra |
| Photo Child Smile | Image | Photograph |
| Photo Child Smile | Object | Child |
| Photo Child Smile | Situation | Smile |
| CG Republic of the Congo News | Nation | Republic of the Congo |
| CG Republic of the Congo News | Document | News |
| ⋮ | ⋮ | ⋮ |

| SEARCH QUERY |
|---|
| CG bag Zebra |
| Photograph child |
| Congo News |
| . . . |

FIG.7

| TRAINING DATA (DB3) ||||
|---|---|---|---|
| INPUT PORTION | OUTPUT PORTION ||
| | ATTRIBUTE | ATTRIBUTE VALUE |
| CG bag Zebra | Image | Computer Graphic |
| CG bag Zebra | Pattern | Zebra |
| Photograph child | Image | Photograph |
| Photograph child | Object | Child |
| Congo News | Nation | Republic of the Congo |
| Congo News | Document | News |
| ... | ... | ... |

| SEARCH QUERY | PAGE INFORMATION | | |
|---|---|---|---|
| | TITLE | ATTRIBUTE | ATTRIBUTE VALUE |
| Computer Graphic bag Zebra | Computer Graphic Bag Zebra JPG | Image | Computer Graphic |
| Computer Graphic bag Zebra | Computer Graphic Bag Zebra JPG | Pattern | Zebra |
| Computer Graphic bag Zebra | CG Leather Bag | Image | Computer Graphic |
| Computer Graphic bag Zebra | CG Leather Bag | Material | Leather |
| CG bag Zebra | Computer Graphic Bag Zebra JPG | Image | Computer Graphic |
| CG bag Zebra | Computer Graphic Bag Zebra JPG | Pattern | Zebra |
| CG bag Zebra | CG Leather Bag | Image | Computer Graphic |
| CG bag Zebra | CG Leather Bag | Material | Leather |
| ... | ... | ... | ... |

PROCESSING EXECUTION SYSTEM, PROCESSING EXECUTION METHOD, AND PROGRAM

CROSS REFERENCE TO RELATED APPLICATIONS

This application is a National Stage of International Application No. PCT/JP2022/003988 filed on Feb. 2, 2022, which claims priority from International Application No. PCT/JP2021/040852, filed on Nov. 5, 2021. The contents of the above documents are incorporated herein by reference in their entirety.

TECHNICAL FIELD

The present disclosure relates to a processing execution system, a processing execution method, and a program.

BACKGROUND ART

Hitherto, technologies for estimating a classification of predetermined data through use of a model relating to machine learning have been known. For example, in Patent Literature 1, there is described a technology for providing a user who has input a search query with useful information through use of a model which outputs estimation results for the classification of a keyword included in a search query. In the technology as disclosed in Patent Literature 1, the output of the model is exemplified by a domain indicating the type of search result, the type of search, the type of search target, or the like.

CITATION LIST

Patent Literature

[PTL 1] JP 2020-16960 A

SUMMARY OF INVENTION

Technical Problem

However, with the technology as disclosed in Patent Literature 1, when the accuracy of the model is not sufficient due to insufficient training data, an inappropriate domain is output from the model, and hence there has been a possibility that useful information cannot be provided to a user. This point is not limited to such a model as described in Patent Literature 1, and the same applies to models for estimating other classifications for other purposes. For this reason, with the related-art technology, it has not been possible to obtain a desired result when the accuracy of the model is not sufficient due to insufficient training data.

One object of the present disclosure is to obtain a desired result even when the accuracy of a model is not sufficient due to insufficient training data.

Solution to Problem

According to one aspect of the present disclosure, there is provided a processing execution system including: a second classification information acquisition module configured to acquire second classification information relating to a classification of second data based on a first model which has learned a relationship between first data and first classification information relating to a classification of the first data; a validity estimation module configured to estimate, based on a predetermined estimation method, a validity relating to a combination of the second data and the second classification information; and an execution module configured to execute predetermined processing based on an estimation result for the validity.

Advantageous Effects of Invention

According to the present disclosure, it is possible to obtain a desired result even when the accuracy of the model is not sufficient due to insufficient training data.

BRIEF DESCRIPTION OF DRAWINGS

FIG. 5 is a table for showing an example of a page database.
FIG. 6 is a table for showing an example of a search query database.
FIG. 7 is a table for showing an example of a training database.
FIG. 8 is a table for showing an example of a query selection database.

DESCRIPTION OF EMBODIMENTS

1. Overall Configuration of Processing Execution System

Figure 1:
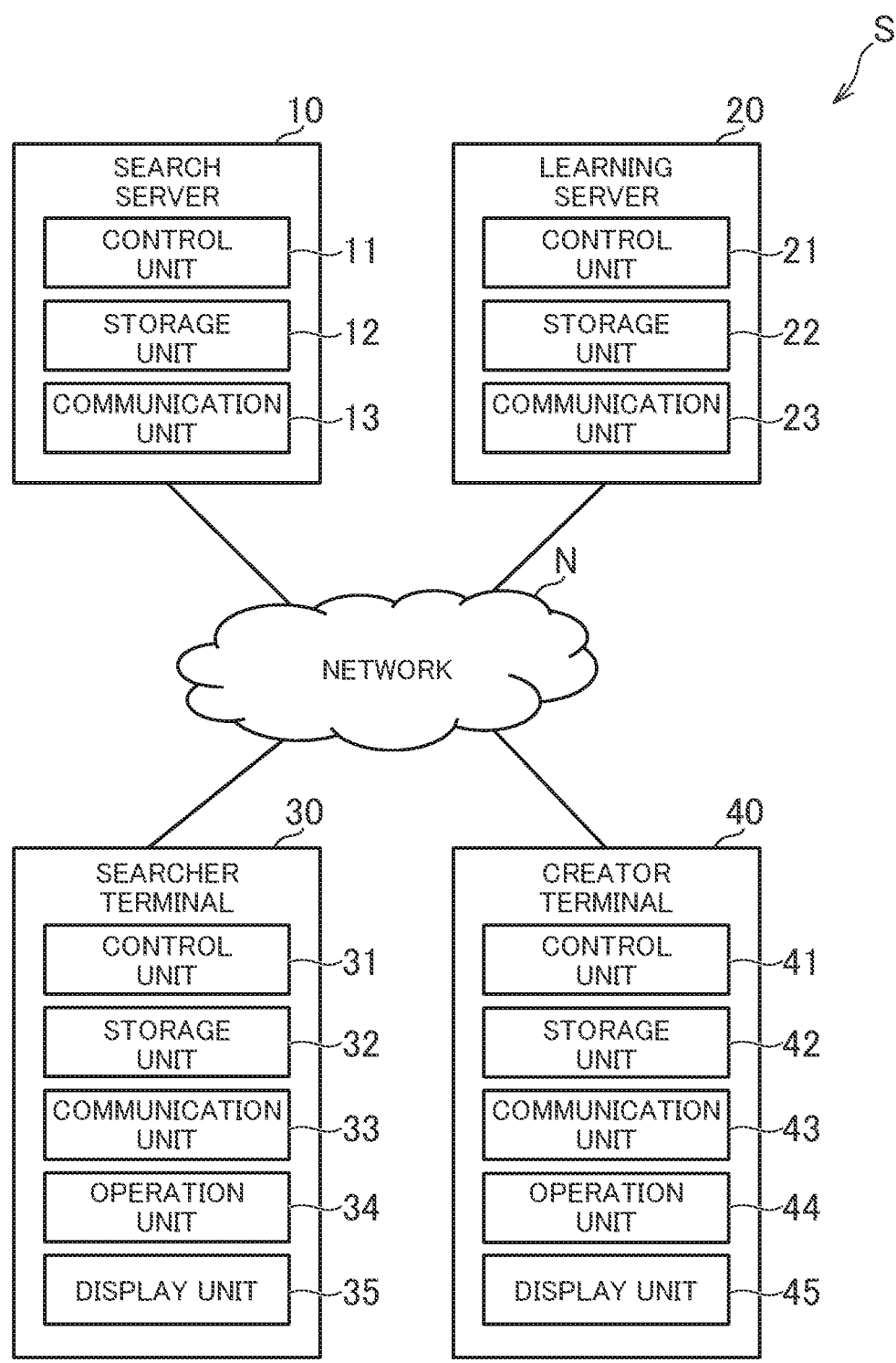
FIG. 1 is a diagram for illustrating an example of an overall configuration of a processing execution system.

Description is now given of an example of an embodiment of a processing execution system according to the present disclosure. FIG. 1 is a diagram for illustrating an example of an overall configuration of the processing execution system. A network N is any network, such as the Internet or a LAN. It is only required that the processing execution system S include at least one computer, and is not limited to the example of FIG. 1.

The search server 10 is a server computer. A control unit 11 includes at least one processor. A storage unit 12 includes a volatile memory such as a RAM, and a nonvolatile memory such as a hard disk drive. A communication unit 13 includes at least one of a communication interface for wired communication or a communication interface for wireless communication.

A learning server 20 is a server computer. Physical configurations of a control unit 21, a storage unit 22, and a communication unit 23 are the same as those of the control unit 11, the storage unit 12, and the communication unit 13, respectively.

A searcher terminal 30 is a computer of a searcher being a user who inputs a search query. For example, the searcher terminal 30 is a personal computer, a smartphone, a tablet terminal, or a wearable terminal. Physical configurations of a control unit 31, a storage unit 32, and a communication unit 33 are the same as those of the control unit 11, the storage unit 12, and the communication unit 13, respectively. An operation unit 34 is an input device such as a touch panel or a mouse. A display unit 35 is a liquid crystal display or an organic EL display.

A creator terminal 40 is a computer of a creator being a user who creates data to be searched for. For example, the creator terminal 40 is a personal computer, a smartphone, a tablet terminal, or a wearable terminal. Physical configurations of a control unit 41, a storage unit 42, a communication unit 43, an operation unit 44, and a display unit 45 are the same as those of the control unit 11, the storage unit 12, the communication unit 13, the operation unit 34, and the display unit 35, respectively.

Programs or data stored in the storage units 12, 22, 32, and 42 may be supplied via the network N. Further, each computer may include at least one of a reading unit (for example, a memory card slot) for reading a computer-readable information storage medium or an input/output unit (for example, a USB port) for inputting/outputting data to and from external devices. For example, a program or data stored in an information storage medium may be supplied via at least one of the reading unit or the input/output unit.

2. Outline of Processing Execution System

In this embodiment, a case in which the processing execution system S is applied to a search service for web pages is taken as an example. The creator creates a web page, and uploads the web page onto the search server 10 or another server computer. The searcher searches for web pages on a browser of the searcher terminal 30. For example, when the searcher operates the searcher terminal 30 to access the search server 10, a portal page of the search service is displayed on the display unit 35.

Figure 2:
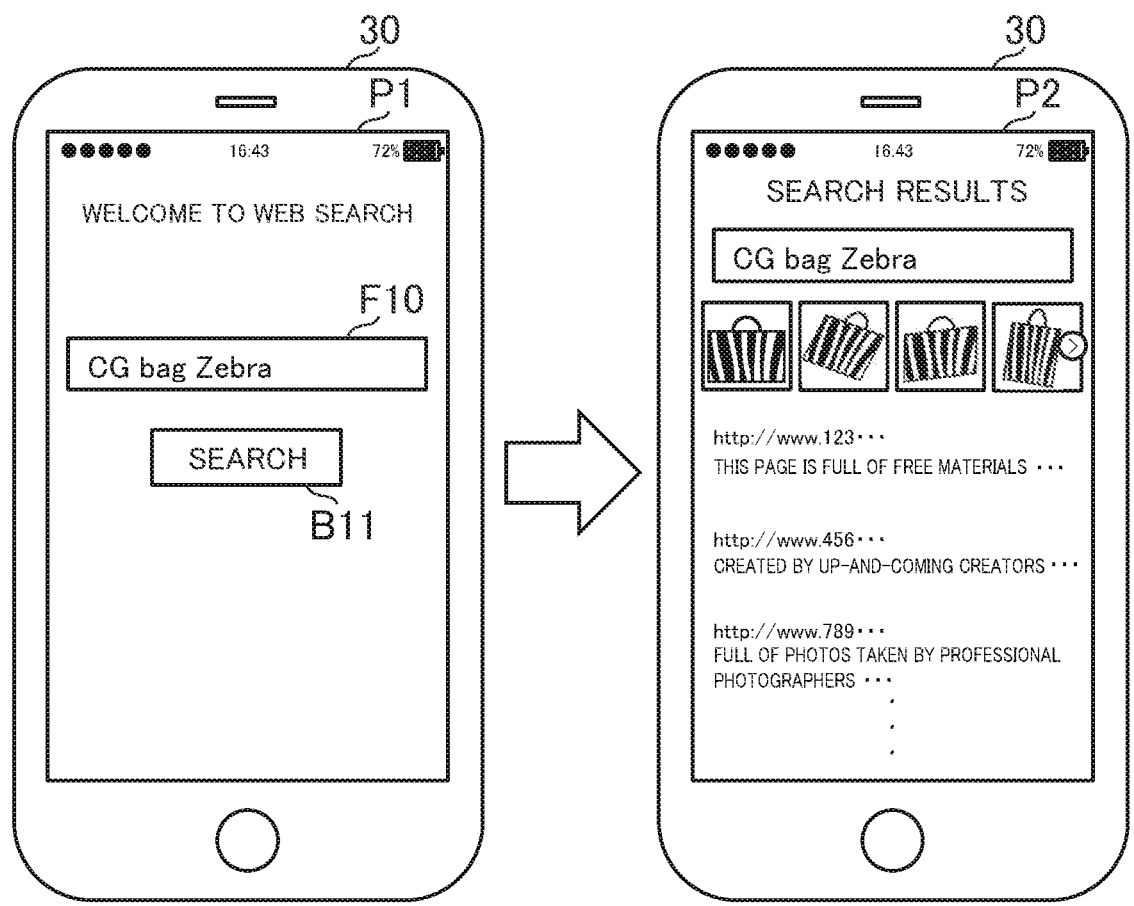
FIG. 2 is a diagram for illustrating an example of how a search is executed from a portal page.

FIG. 2 is a diagram for illustrating an example of how a search is executed from the portal page. For example, the searcher inputs a search query to an input form F10 of a portal page P1. When the searcher selects a button B11, the search server 10 executes search processing for web pages based on the search query. A search results page P2 which shows search results corresponding to the search query input by the searcher is displayed on the display unit 35 of the searcher terminal 30.

The searcher uses the search service by inputting a search query with some intention. In the example of FIG. 2, a search query "CG bag Zebra" is input. In this case, it is inferred that the searcher intends to search for "computer graphics which depict a zebra-patterned bag." When the intention of the searcher can be estimated, for example, the estimated intention can be utilized for marketing in the search service and can increase the accuracy of the search results. Thus, such estimation is extremely useful.

In view of this, in this embodiment, the intention of the searcher is estimated based on a model which uses machine learning. The model for estimating the intention of the searcher is hereinafter referred to as "first model." The first model can utilize various machine learning methods. The first model may be any one of supervised learning, semi-supervised learning, or unsupervised learning. For example, the first model may be a neural network.

In this embodiment, a relationship between a title of each web page and an attribute and attribute value of the web page is learned by the first model. The title is a character string displayed in a title bar of the browser. For example, the title includes a keyword which indicates details of the web page. The title is used as an index at a time of a search. In this embodiment, it is assumed that the creator inputs the title, but the title may be automatically extracted from character strings included in the web page, or may be input by an administrator of the search service.

The attribute of the web page is a classification of the web page. The attribute of the web page can also be referred to as the type, category, or genre of the web page. The attribute is represented by letters, numbers, other symbols, or a combination of those. The attribute may be any attribute capable of classifying the web page from a predetermined point of view, and the attribute can be set from any point of view. For example, a web page which provides free images is associated with an attribute "Image." For example, a web page which provides a document such as a news article is associated with an attribute "Document."

The attribute value of the web page is a specific value of an attribute. At least one attribute value is associated with each attribute. At least one of attribute values associated with each attribute is associated with the web page. The attribute value is represented by letters, numbers, other symbols, or a combination of those. The attribute value is only required to define the details of the attribute from a predetermined point of view, and the attribute value can be set from any point of view.

Assuming that, for example, an attribute value "Computer Graphic" and an attribute value "Photograph" are associated with the attribute "Image," any one of the attribute value "Computer Graphic" or the attribute value "Photograph" is associated with a web page of the attribute "Image." Assuming that, for example, an attribute value "News" and an attribute value "Advertisement" are associated with the attribute "Document," any one of the attribute value "News" or the attribute value "Advertisement" is associated with a web page of the attribute "Document."

The creator creates a web page with some intention. For example, a web page of the attribute "Image" and the attribute value "Computer Graphic" is created with an intention of distributing computer graphic images. For example, a web page of the attribute "Document" and the attribute value "News" is created with an intention of distributing news article documents. The intention of the creator is considered to be represented by the title, attribute, and attribute value of the web page. Thus, the relationship between the title of the web page and the attribute and attribute value of the web page is considered to be similar to a relationship between the search query input by the searcher and the intention of the searcher.

In view of this, in this embodiment, in order to estimate the intention of the searcher, the first model which has learned the relationship between the title of the web page and the attribute and attribute value of the web page as training data is used. A search query is input to the first model as information corresponding to the title of the web page. The first model outputs the intention of the searcher as information corresponding to the attribute and attribute value of the web page.

For example, when the training data for the first model to learn is not sufficient, the accuracy of the first model cannot be sufficiently improved. In this case, even when a search query is input to the first model, there is a possibility that the intention of the searcher output from the first model becomes inappropriate. In view of this, even when the accuracy of the first model is not sufficient due to insufficient training data, the processing execution system S according to this embodiment can accurately estimate the intention of the searcher.

Figure 3:
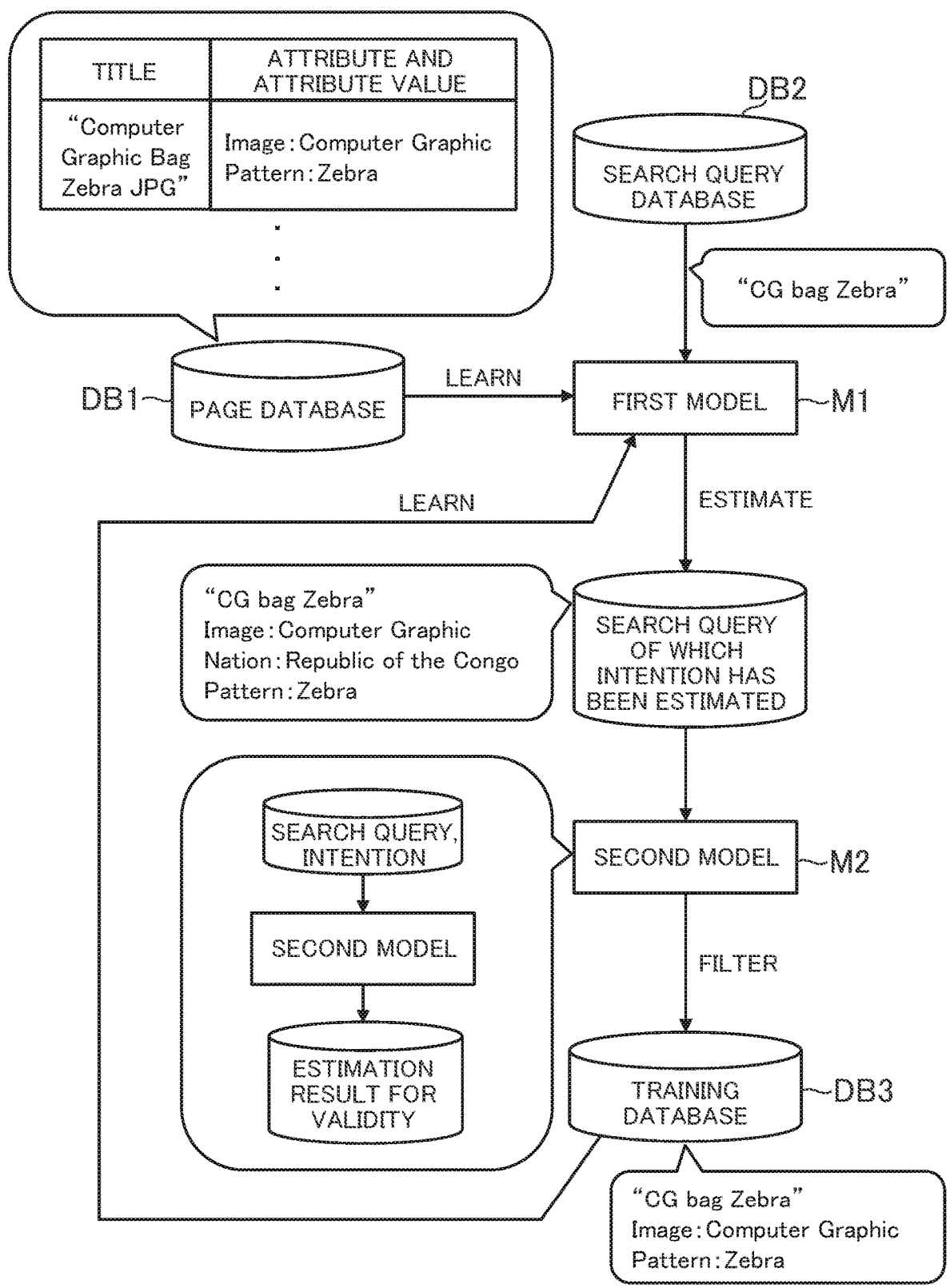
FIG. 3 is a diagram for illustrating an outline of the processing execution system.

FIG. 3 is a diagram for illustrating an outline of the processing execution system S. As illustrated in FIG. 3, the title of a web page and the attribute and attribute value of the web page are stored in a page database DB1 in association with each other. Pairs of those are learned by a first model M1 as training data. A search query database DB2 stores search queries input in the past. In this embodiment, the intention of the searcher who has input the search queries is estimated.

When a search query is input to the first model M1, the first model M1 estimates the attribute and the attribute value as the intention of the searcher. In the example of FIG. 3, the search query "CG bag Zebra" of FIG. 2 is input to the first model M1. The first model M1 outputs, as the intention of the searcher, three estimation results such as the attribute value "Computer Graphic" of the attribute "Image," the attribute value "Republic of the Congo" of the attribute "Nation," and the attribute value "Zebra" of the attribute "Pattern."

As described above, the intention of the searcher who has input the search query of FIG. 3 is to search for "computer graphics which depict a zebra-patterned bag." This intention is represented by the attribute value "Computer Graphic" of the attribute "Image" and the attribute value "Zebra" of the attribute "Pattern" among the three estimation results output by the first model M1.

Meanwhile, among the three estimation results output by the first model M1, the attribute value "Republic of the Congo" of the attribute "Nation" does not represent the intention of the user. For example, when the accuracy of the first model M1 is not sufficient due to insufficient training data, such an inappropriate estimation result may be output. This is considered to be because the first model M1 has learned for some reason that the character string "CG," which is a part of the search query, is the country code of the Republic of the Congo.

In this embodiment, a second model M2 for eliminating an inappropriate estimation result is prepared. The second model M2 is a model which uses machine learning. The second model M2 can utilize various machine learning methods. The second model M2 may be any one of supervised learning, semi-supervised learning, or unsupervised learning. For example, the second model may be a neural network. For example, when the second model M2 receives input of a pair of a search query and the intention of the searcher (that is, a pair of a search query input to the first model M1 and an estimation result output from the first model M1), the second model M2 outputs the validity of this pair.

In the example of FIG. 3, the second model M2 estimates that the attribute value "Computer Graphic" of the attribute "Image" and the attribute value "Zebra" of the attribute "Pattern" among the three estimation results output from the first model M1 are valid. The second model M2 estimates that the attribute value "Republic of the Congo" of the attribute "Nation" among the three estimation results output from the first model M1 is not valid.

In this embodiment, training data for the first model M1 is generated based on the estimation results of the second model M2. In the example of FIG. 3, training data including a pair of the search query "CG bag Zebra" and the attribute value "Computer Graphic" of the attribute "Image" and training data including a pair of the search query "CG bag Zebra" and the attribute value "Zebra" of the attribute "Pattern" are generated. Those two pieces of training data are learned by the first model M1.

As described above, the processing execution system S estimates the intention of the searcher who has input the search query based on the first model M1. The processing execution system S eliminates an invalid estimation result from among the estimation results of the first model M1 based on the second model M2 to generate training data for the first model M1. The processing execution system S causes the first model M1 to learn the generated training data. This increases the accuracy of the first model M1 even when the training data stored in the page database DB1 is not sufficient. It is also possible to save the time and effort of creating training data for the first model M1. Now, the details of the processing execution system S are described.

3. Functions to be Implemented in Processing Execution System

Figure 4:
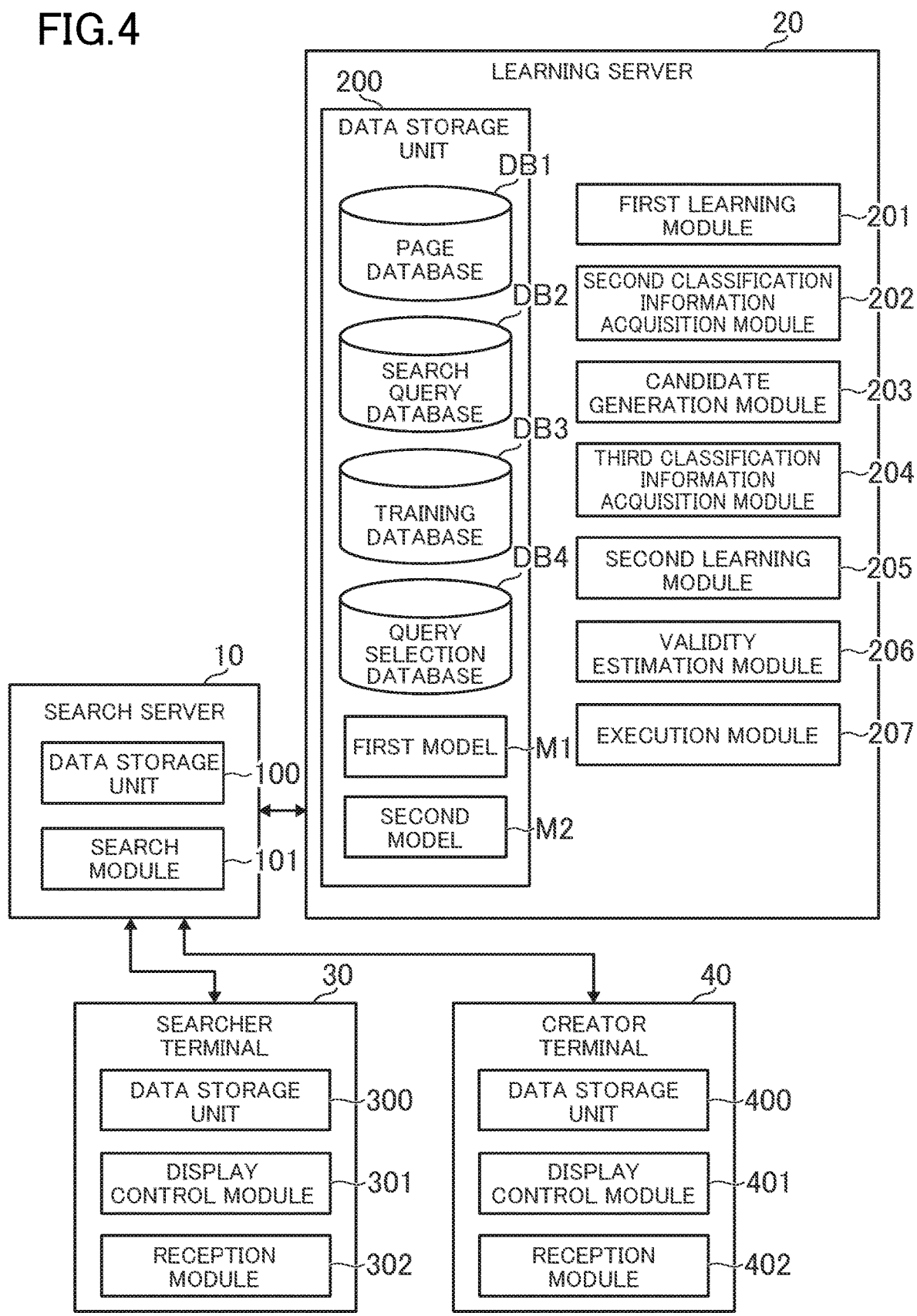
FIG. 4 is a functional block diagram for illustrating an example of functions to be implemented in the processing execution system.

FIG. 4 is a functional block diagram for illustrating an example of functions to be implemented in the processing execution system S.

3-1. Functions to be Implemented in Search Server

A data storage unit 100 is implemented mainly by the storage unit 12. A search module 101 is implemented mainly by the control unit 11.

Data Storage Unit

The data storage unit 100 stores data required for providing a search service. For example, the data storage unit 100 stores a database in which web page indexes and web page URLs are stored in association with each other. An index is information to be compared with a search query. Any information can be used as the index. For example, the title of the web page, the attribute and attribute value of the web page, any keyword included in the web page, or a combination of those is used as the index. For example, the data storage unit 100 stores data (for example, HTML data) for displaying the portal page P1 and the search results page P2. In addition, for example, the data storage unit 100 may store a history of search queries input in the past and may store query selection data described later.

Search Module

The search module 101 executes search processing based on a search query input by the searcher. As the search processing itself, various search engines can be applied. For example, the search module 101 calculates a search score of the web page based on the search query input by the searcher and the web page index stored in the data storage unit 100. The search score indicates a degree of matching between the search query and the index. As the search score calculation method itself, calculation methods employed by various search engines can be applied.

The search module 101 selects a predetermined number of web pages in descending order of the search score, and generates a search results page P2 including links to the selected web pages. The search module 101 transmits the data of the search results page P2 to the searcher terminal 30. When the search module 101 receives a result of selection by the searcher from the searcher terminal 30, the search module 101 causes the searcher terminal 30 to access the web page corresponding to the link selected by the searcher. The search module 101 records, in the data storage unit 100, the relationship between the search query input by the searcher and the web page corresponding to the link selected by the searcher. This relationship corresponds to the query selection data described later.

3-2. Functions to be Implemented in Learning Server

A data storage unit 200 is implemented mainly by the storage unit 22. A first learning module 201, a second classification information acquisition module 202, a candidate generation module 203, a third classification information acquisition module 204, a second learning module 205, a validity estimation module 206, and an execution module 207 are each implemented mainly by the control unit 21.

Data Storage Unit

The data storage unit 200 stores data required for processing described with reference to FIG. 3. For example, the data storage unit 200 stores the page database DB1, the search query database DB2, a training database DB3, a query selection database DB4, the first model M1, and the second model M2.

FIG. 5 is a table for showing an example of the page database DB1. The page database DB1 is a database which stores information relating to web pages. For example, the page database DB1 stores the titles of the web pages in association with the attributes and attribute values of the web pages.

For example, the learning server 20 acquires, from the search server 10 or another server onto which the creator has uploaded a web page, a pair of the title of the web page and the attribute and attribute value of the web page, and stores the acquired pair in the page database DB1. The pair stored in the page database DB1 is used as the training data for the first model M1. This training data is used to generate an initial first model M1 described later.

The training data for the first model M1 includes pairs of an input portion and an output portion. The input portion of the training data for the first model M1 has the same format as that of the data actually input to the first model M1. In this embodiment, a character string indicating the search query is input to the first model M1, and hence the input portion of the training data for the first model M1 is a character string. The output portion of the training data for the first model M1 has the same format as that of the data actually output from the first model M1. In this embodiment, a combination of a character string indicating the attribute and a character string indicating the attribute value is output from the first model M1, and hence the output portion of the training data for the first model M1 includes a combination of two character strings.

FIG. 6 is a table for showing an example of the search query database DB2. The search query database DB2 is a database which stores the search queries input in the past. When the search server 10 executes the search processing based on the search query input by the searcher, the search server 10 transmits the search query to the learning server 20. The learning server 20 stores, in the search query database DB2, the search query received from the search server 10.

FIG. 7 is a table for showing an example of the training database DB3. The training database DB3 is a database which stores the training data for the first model M1. This training data is generated by the execution module 207 described later. This training data is used to increase the accuracy of the initial first model M1 described later. The format of the training data stored in the training database DB3 is the same as that of the training data stored in the page database DB1. The format itself of those pieces of training data is the same, but specific details indicated by those pieces of training data differ from each other.

For example, the input portion of the training data stored in the page database DB1 is a character string indicating the title of the web page, while the input portion of the training data stored in the training database DB3 is a character string indicating the search query. Those input portions are the same in the sense that both are character strings respectively input by the creator and the searcher with some intentions, but have specific details which differ from each other.

For example, the output portion of the training data stored in the page database DB1 is a character string indicating each of the attribute and attribute value of the web page, while the output portion of the training data stored in the training database DB3 is a character string indicating the intention of the searcher. Those output portion are the same in the sense that both are character strings respectively representing the intentions of the creator and the searcher in some way, but have specific details which differ from each other.

FIG. 8 is a table for showing an example of the query selection database DB4. The query selection database DB4 is a database which stores the query selection data. The query selection data is data indicating the selection results for search queries. The query selection data may also be referred to as "query click log." For example, the query selection database DB4 stores search queries in association with page information.

The page information is information relating to a web page. The web page is the web page indicated by the link selected on the search results page P2 by the searcher who input the search query. This web page is actually selected by the searcher, and hence it can be said that the web page is in line with the intention of the searcher. For example, the page information includes the title, attribute, and attribute value of the web page. The page information may include any information, and may include, for example, the web page URL and the browsing date and time.

The data storage unit 200 stores the trained first model M1. The first model M1 includes a program portion for executing processing such as convolution and a parameter portion such as a weight. In this embodiment, the first model M1 is a multi-label model. The multi-label model can estimate a plurality of classifications from the input data. The first model M1 learns the relationship between the title of the web page and the attribute and attribute value of the web page.

The title of the web page is an example of first data. Thus, the title of the web page as used herein can be read as the first data. The first data is the input portion of the training data for the initial first model M1. The initial first model M1 means the first model M1 obtained before the training data generated by the execution module 207 is learned. In this embodiment, the page database DB1 is used to generate the training data for the initial first model M1, and hence the first data is the title of the web page stored in the page database DB1.

The first data may be any data that can be used in the learning of the first model M1, and the first data is not limited to the title of the web page. For example, the first data may be a character string other than the title included in the web page, a keyword to be used as the web page index, or a summary created from the web page. In place of being a character string itself, the first data may be a feature amount indicating some kind of feature of a character string. The first data may have any format and is not limited to being a character string. For example, the first data may be image data, moving image data, document data, or any other data. For example, the first data may be data referred to as "content."

The attribute and attribute value of the web page are an example of first classification information. Thus, the attribute and attribute value of the web page as used herein can be read as the first classification information. The first classification information is information relating to a classification of the first data. The first classification information is the output portion of the training data for the initial first model M1. In this embodiment, the page database DB1 is used to generate the training data for the initial first model M1, and hence the first classification information is the attribute and attribute value which are stored in the page database DB1. In this embodiment, the first data and the first classification information are data to be used as the indexes at the time of a search.

The first classification information may be any information that can be used in the learning of the first model M1, and is not limited to the attribute and attribute value of a web page. For example, the first classification information may indicate only any one of the attribute or attribute value of the web page. The first classification information may have any format and is not limited to being a character string. For example, the first classification information may be information such as an ID or a number that can uniquely identify the classification. In this embodiment, there is described a case in which each one of the pairs of the attribute and the attribute value corresponds to the first classification information. Thus, a plurality of pieces of first classification information may be associated with one certain piece of first data. A plurality of pairs of the attribute and the attribute value may be handled as one piece of first classification information. In this case, one piece of first classification information is associated with one certain piece of first data.

For example, the first model M1 learns a relationship between the first data and the first classification information which have been acquired based on the page database DB1 including candidates for the first data and candidates for the first classification information. The page database DB1 is an example of a first database. Thus, the page database DB as used herein can be read as the first database. The first database is a database which stores data serving as the candidates for the training data for the initial first model M1. All or some pieces of data of the first database are used as the training data for the initial first model M1.

The data storage unit 200 stores the trained second model M2. The second model M2 includes a program portion for executing processing such as convolution and a parameter portion such as a weight. In this embodiment, there is described a case in which the second model M2 outputs information indicating the fact of being valid or not (a first value indicating the fact of being valid or a second value indicating the fact of not being valid), but the second model M2 may output a score indicating the validity. That is, in place of being binary information such as being valid or not, the output of the second model M2 may be information having an intermediate value such as a score. The second model M2 has learned a relationship between a combination of the search query and the attribute and attribute value and the validity of the combination.

The search query associated with the attribute and attribute value is an example of third data. Thus, the search query associated with the attribute and attribute value as used herein can be read as the third data. The third data is the input portion of training data for the second model M2. In this embodiment, the query selection database DB4 is used to generate the training data for the second model M2, and hence the search query stored in the query selection database DB4 corresponds to the third data. In this embodiment, the estimation result of the initial first model M1 is also used in the learning of the second model M2, and hence a search query input to the initial first model M1 also corresponds to the third data.

The third data may be any data that can be used in the learning of the second model M2, and is not limited to being a search query. For example, the third data may be the title of the web page, a character string other than the title included in the web page, a keyword to be used as the web page index, or a summary created from the web page. In place of being a character string itself, the third data may be a feature amount indicating some kind of feature of a character string. The third data may have any format and is not limited to being a character string. For example, the third data may be image data, moving image data, document data, or any other data. For example, the third data may be data referred to as "content."

The attribute and attribute value associated with the search query are an example of third classification information. Thus, the attribute and attribute value associated with the search query as used herein can be read as the third classification information. The third classification information is information relating to a classification of the third data. The third classification information is the output portion of the training data for the second model M2. In this embodiment, the query selection database DB4 is used to generate the training data for the second model M2, and hence the attribute and attribute value stored in the query selection database DB4 correspond to the third classification information. In this embodiment, the estimation result of the initial first model M1 is also used in the learning of the second model M2, and hence the attribute and attribute value estimated by the initial first model M1 also correspond to the third classification information.

The third classification information may be any information that can be used in the learning of the second model M2, and is not limited to the attribute and attribute value associated with the search query. For example, the third classification information may indicate only any one of the attribute or attribute value associated with the search query. The third classification information may have any format and is not limited to being a character string. For example, the third classification information may be information such as an ID or a number that can uniquely identify the classification. In this embodiment, there is described a case in which each one of the pairs of the attribute and the attribute value corresponds to the third classification information. Thus, a plurality of pieces of third classification information may be associated with one certain piece of third data. A plurality of pairs of the attribute and the attribute value may be handled as one piece of third classification information. In this case, one piece of third classification information is associated with one certain piece of third data.

The second model M2 learns a relationship between a combination of the third data and the third classification information and a validity indicating that the combination is valid. For example, the second model M2 learns a relationship between the third data and the third classification information which have been acquired based on the query selection database DB4 including candidates for the third data and candidates for the third classification information. The query selection database DB4 is an example of a second database. Thus, the query selection database DB4 as used herein can be read as the second database.

The second database is a database which stores data serving as the candidates for the training data for the second model M2. All or some pieces of data of the second database are used as the training data for the second model M2. The second database is a database obtained from a point of view different from that of the first database. A point of view means specific details of data to be used as the training data. Different types of data are used as the input portion included in the training data for the first model M1 and the input portion included in the training data for the second model M2. In this embodiment, the input portion included in the training data for the first model M1 is the title of the web page, while the input portion included in the training data for the second model M2 is the search query. The title of the web page and the search query are the same in the sense that both are character strings, but have specific details which differ from each other.

First Learning Module

The first learning module 201 executes the learning processing of the first model M1. In this embodiment, the data stored in the page database DB1 is used as the training data for the first model M1, and hence the first learning module 201 executes the learning processing of the first model M1 based on this training data. For example, the first learning module 201 executes the learning processing of the first model M1 so that the attribute and attribute value, which are the output portions of the training data, are output when the title of the web page, which is the input portion of the training data, is input. Various algorithms can be used for the learning processing itself of the first model M1. For example, an error backpropagation method or a gradient descent method can be used.

Second Classification Information Acquisition Module

The second classification information acquisition module 202 acquires an attribute and attribute value of a search query (that is, an estimation result for the intention of the searcher) based on the first model M1 which has learned the relationship between the title of each web page and the attribute and attribute value of the title.

A search query with which any attribute or attribute value is not associated is an example of second data. Thus, the search query with which any attribute or attribute value is not associated as used herein can be read as the second data. The second data is data to be input to the first model M1. The econd data has the same format as that of the first data. In this embodiment, the search query with which any attribute or attribute value is not associated is stored in the search query database DB2, and hence the search query stored in the search query database DB2 corresponds to the second data. That is, the second data is the search query input by the user.

The second data may be any data that is to be estimated by the first model M1, and is not limited to a search query. For example, in place of estimating the intention of the searcher, in a case of estimating the intention of the creator, the second data may be the title of the web page, a character string other than the title included in the web page, a keyword to be used as the web page index, or a summary created from the web page. In place of being a character string itself, the second data may be a feature amount indicating some kind of feature of a character string. The second data may have any format and is not limited to being a character string. For example, the second data may be image data, moving image data, document data, or any other data. For example, the second data may be data referred to as "content."

The attribute and the attribute value estimated for the search query are an example of second classification information. Thus, the attribute and the attribute value estimated for the search query as used herein can be read as the second classification information. The second classification information is information relating to a classification of the second data. In this embodiment, the second data is the search query, and hence the second classification information is information relating to a classification of the search query. For example, the second classification information is information relating to the intention of the user who has input the search query. The second classification information is the attribute and attribute value estimated by the first model M1. In this embodiment, the validity is estimated by the second model M2, and hence the attribute and attribute value having the validity estimated by the second model M2 correspond to the second classification information.

The second classification information may be any information that indicates the estimation result of the first model M1, and is not limited to the attribute and attribute value of a search query. For example, the second classification information may indicate only any one of the attribute or attribute value of the search query. The second classification information may have any format and is not limited to being a character string. For example, the second classification information may be information such as an ID or a number that can uniquely identify the classification. In this embodiment, there is described a case in which each one of the pairs of the attribute and the attribute value corresponds to the second classification information. Thus, a plurality of pieces of second classification information may be associated with one certain piece of second data. A plurality of pairs of the attribute and the attribute value may be handled as one piece of second classification information. In this case, one piece of second classification information is associated with one certain piece of second data.

For example, the second classification information acquisition module 202 inputs the search query stored in the search query database DB2 to the first model M1 as the second data. The first model M1 calculates the feature amount of this search query, and outputs the attribute and attribute value corresponding to the feature amount as the estimation result. The second classification information acquisition module 202 acquires, as the second classification information, the attribute and attribute value output from the first model M1. In this embodiment, the first model M1 is a multi-label model, and hence the second classification information acquisition module 202 acquires a plurality of attributes and attribute values based on the first model M1. Even when the first model M1 is a multi-label model, there may be a case in which only one attribute and attribute value are estimated.

In this embodiment, it is assumed that the calculation of the feature amount or the like required for the processing of the first model M1 is performed in the first model M1. Thus, there is described a case in which the second data is directly input to the first model M1, but when the second data requires some aggregation processing or the like, the second data may be input to the first model M1 after the aggregation processing or the like has been executed thereon outside the first model M1. That is, in place of being directly input to the first model M1, the second data may be input to the first model M1 after some processing has been executed on the second data.

Candidate Generation Module

The candidate generation module 203 generates, based on each of a plurality of generation methods, candidates for the search query, which is the third data, and the attribute and attribute value, which are the third classification information. A candidate means data or information that can become the third data or the third classification information. In this embodiment, two generation methods, namely, a generation method using the query selection database DB4 and a generation method using the initial first model M1, are taken as examples. The candidate generation module 203 may generate candidates based on only any one of those two generation methods.

Figure 9:
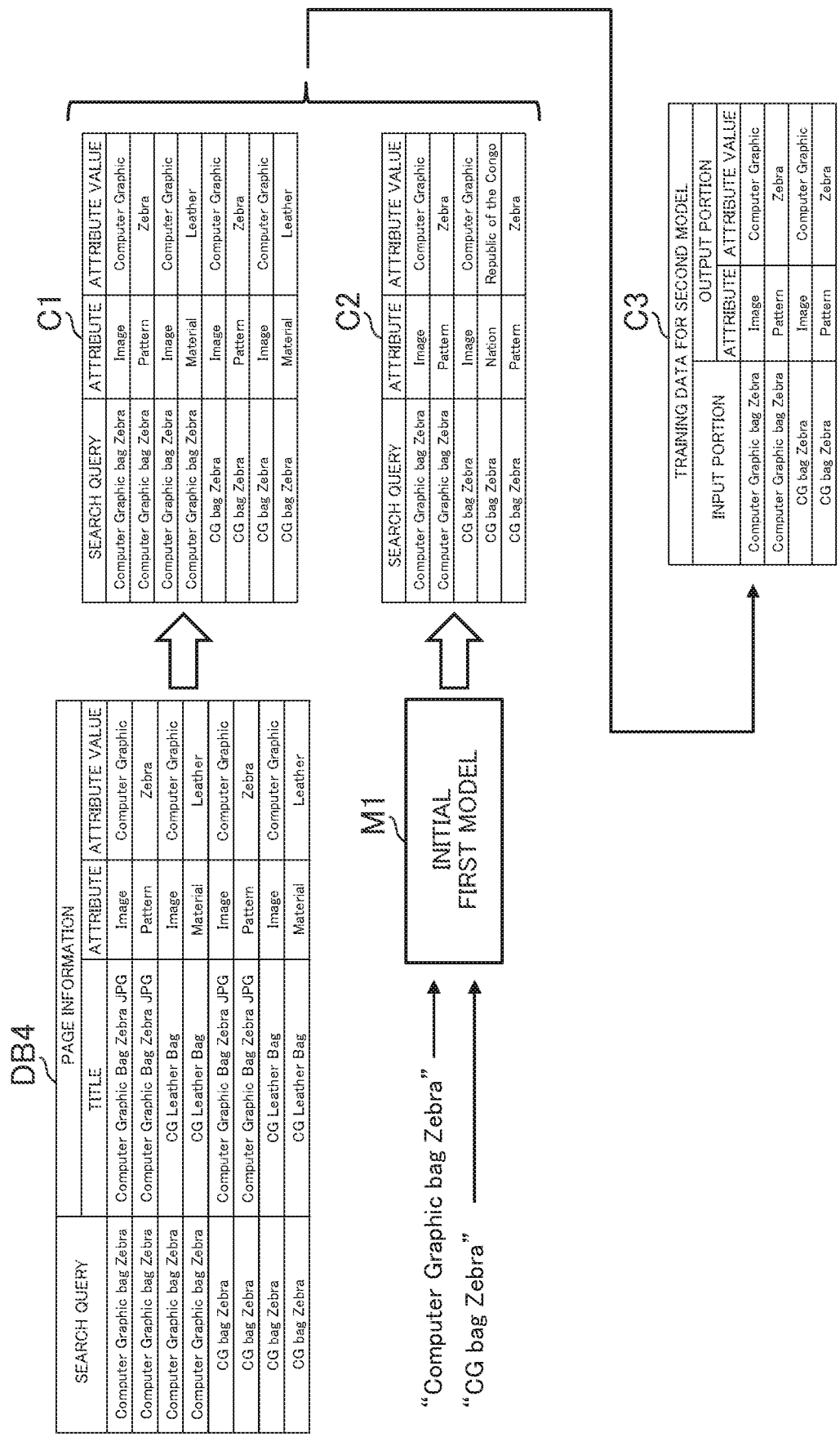
FIG. 9 is a diagram for illustrating an example of a method of generating training data for a second model.

FIG. 9 is a diagram for illustrating an example of a method of generating the training data for the second model M2. As illustrated in FIG. 9, the candidate generation module 203 acquires, as candidates C1, the search queries stored in the query selection database DB4 and the attributes and attribute values of the web pages that have been selected by the searcher who has input the search queries. The candidate generation module 203 inputs the search queries stored in the search query database DB2 to the initial first model M1, and acquires the attributes and attribute values output from the initial first model M1, to thereby acquire candidates C2.

The second model M2 learns, as the third data and the third classification information, candidates C3 generated by a plurality of methods among the plurality of generation methods. In the example of FIG. 9, only the candidates C3 acquired by both the generation method using the query selection database DB4 and the generation method using the initial first model M1 are learned by the second model M2. The candidates C3 are obtained as the AND of the candidates C1 and the candidates C2. The candidates acquired by only any one of the generation method using the query selection database DB4 or the generation method using the initial first model M1 are not learned by the second model M2.

Third Classification Information Acquisition Module

The third classification information acquisition module 204 acquires the attribute and attribute value, which are the third classification information, based on the search query, which is the third data, and the first model M1. This first model M1 is the initial first model M1. The third classification information acquisition module 204 inputs the search query stored in the query selection database DB4 to the initial first model M1. The initial first model M1 calculates the feature amount of this search query, and outputs the attribute and attribute value corresponding to the feature amount as the estimation result. The processing itself of the first model M1 for acquiring the attribute and attribute value serving as the third classification information is the same as the processing for acquiring the attribute and attribute value serving as the second classification information (processing described in relation to the function of the second classification information acquisition module 202).

In this embodiment, the attributes and attribute values acquired by the third classification information acquisition module 204 are the candidates C2 of FIG. 9. In this embodiment, of the candidates C2, ones that also appear in the candidates C1 become the training data for the second model M2, and the candidates C2 may be set as the training data for the second model M2 irrespective of the candidates C1. That is, the attributes and attribute values acquired by the third classification information acquisition module 204 may be directly used as the training data for the second model M2. In contrast, the candidates C1 may be set as the training data for the second model M2 irrespective of the candidates C2.

Second Learning Module

The second learning module 205 executes the learning processing of the second model M2. In this embodiment, the data stored in the training database DB3 is used as the training data for the second model M2, and hence the second learning module 205 executes the learning processing of the second model M2 based on this training data. For example, the second learning module 205 executes the learning processing of the second model M2 so that, when a combination of the search query, which is the input portion of the training data, and the attribute and attribute value is input, the validity relating to the combination is output. Various algorithms can be used for the learning processing itself of the second model M2. For example, an error backpropagation method or a gradient descent method can be used.

Validity Estimation Module

The validity estimation module 206 estimates, based on a predetermined estimation method, a validity relating to a combination of the search query, which is the second data, and the attribute and attribute value, which are the second classification information. A validity means whether or not there is a validity for the processing of the execution module 207 or an extent of being valid for the processing of the execution module 207. In this embodiment, the execution module 207 executes generation processing for training data, and hence whether or not the above-mentioned combination is suitable as the training data or an extent to which the above-mentioned combination is suitable as the training data corresponds to the validity. The validity can be said to be suitability in the processing of the execution module 207.

In this embodiment, there is described a case in which the validity estimation module 206 determining whether or not the above-mentioned combination is valid corresponds to estimating the validity, but acquiring a score indicating a degree of validity may correspond to estimating the validity. The score indicates a level of validity. The scores may be represented by numbers, or may be represented by characters of "S rank," "A rank," and "B rank" or other symbols.

In this embodiment, as an example of the estimation method of the validity estimation module 206, there is described a method using the second model M2 which has learned the relationship between a combination of the search query, which is the third data, and the attribute and attribute value, which are the third classification information, and the validity of the combination. The validity estimation module 206 estimates the validity based on the second model M2. When a plurality of attributes and attribute values are estimated for a search query, the validity estimation module 206 estimates the validity for each attribute and attribute value. For example, for each attribute and attribute value, the validity estimation module 206 inputs a combination of the search query and the each attribute and attribute value to the second model M2, and acquires an estimation result for the validity output from the second model M2.

In the example of FIG. 3, the attribute value "Computer Graphic" of the attribute "Image," the attribute value "Republic of the Congo" of the attribute "Nation," and the attribute value "Zebra" of the attribute "Pattern" are estimated for the search query "CG bag Zebra." As illustrated in FIG. 3, when three combinations of the attribute and attribute value are estimated for one search query, three estimation results for the validity are acquired as follows.

For example, the validity estimation module 206 inputs a first combination, which is a combination of the search query "CG bag Zebra" and the attribute value "Computer Graphic" of the attribute "Image," to the second model M2, and acquires an estimation result for the validity of the first combination output from the second model M2. In the example of FIG. 3, this estimation result indicates that the first combination is valid.

For example, the validity estimation module 206 inputs a second combination, which is a combination of the search query "CG bag Zebra" and the attribute value "Republic of the Congo" of the attribute "Nation," to the second model M2, and acquires an estimation result for the validity of the second combination output from the second model M2. In the example of FIG. 3, this estimation result indicates that the second combination is not valid.

For example, the validity estimation module 206 inputs a third combination, which is a combination of the search query "CG bag Zebra" and the attribute value "Zebra" of the attribute "Pattern," to the second model M2, and acquires an estimation result for the validity of the third combination output from the second model M2. In the example of FIG. 3, this estimation result indicates that the third combination is valid.

In this embodiment, the estimation method of the validity estimation module 206 is a method using the query selection data indicating a relationship between a search query input in the past and a result of selection from search results based on the search query. The validity estimation module 206 estimates the validity based on the query selection data. In this embodiment, the learning of the second model M2 has been performed based on the query selection data, and hence estimating the validity based on the second model M2 corresponds to estimating the validity based on the query selection data.

The estimation method of the validity estimation module 206 is not limited to the method using the second model M2. For example, in place of being based on a machine learning method, the validity estimation module 206 may estimate the validity based on a predetermined rule-based estimation method. In this case, it is assumed that there is prepared in advance a rule for outputting the validity when a combination of the search query, which is the second data, and the attribute and attribute value, which are the second classification information, is input. This rule may be a decision tree or the like. As other estimation methods, rule-based or statistics-based estimation methods as described in modification examples described later may be used.

Execution Module

The execution module 207 executes predetermined processing based on the estimation result for the validity obtained by the validity estimation module 206. In this embodiment, the execution module 207 executes, as the predetermined processing, generation processing for generating training data for the first model M1 to learn based on the combination of the search query, which is the second data, and the attribute and attribute value, which are the second classification information, and the estimation result for the validity obtained by the validity estimation module 206. The generation processing is an example of the predetermined processing. Thus, the generation processing as used herein can be read as the predetermined processing. The predetermined processing may be any processing, and is not limited to the generation processing. Other examples of the predetermined processing are described later in the modification examples.

For example, the execution module 207 executes the generation processing by storing a pair of the search query having the validity estimated by the validity estimation module 206 and the attribute and attribute value for which the estimation result indicating that the attribute and attribute value are valid has been obtained, in the training database DB3 as the training data. A pair of the search query having the validity estimated by the validity estimation module 206 and the attribute and attribute value for which the estimation result that does not indicate that the attribute and attribute value are valid has been obtained is not generated as the training data.

When a plurality of attributes and attribute values are acquired as the second classification information, the execution module 207 executes the generation processing based on the validity of each attribute and attribute value. For example, the execution module 207 generates training data for, of the plurality of attributes and attribute values, only the attributes and attribute values for which the estimation results indicating that the attributes and attribute values are valid have been obtained. Of the plurality of attributes and attribute values, the attributes and attribute values for which the estimation results that do not indicate that the attributes and attribute values are valid have been obtained are not generated as the training data.

3-3. Functions to be Implemented by Searcher Terminal

A data storage unit 300 is implemented mainly by the storage unit 32. A display control module 301 and a reception module 302 are implemented mainly by the control unit 31. The data storage unit 300 stores the data required for the search. For example, the data storage unit 300 stores a browser for displaying the portal page P1 and the search results page P2. The screen displayed on the searcher terminal 30 may use another application in place of a browser. In this case, the data storage unit 300 stores the application.

The display control module 301 displays various screens on the display unit 35. For example, when the display control module 301 receives the data of the portal page P1 from the search server 10, the display control module 301 displays the portal page P1 on the display unit 35. When the display control module 301 receives the data of the search results page P2 from the search server 10, the display control module 301 displays the search results page P2 on the display unit 35.

The reception module 302 receives various operations from the operation unit 34. For example, the reception module 302 receives input of a search query to the input form F10 of the portal page P1. The searcher terminal 30 transmits the input search query to the search server 10. For example, the reception module 302 receives a selection of a link included in the search results indicated by the search results page P2. The searcher terminal 30 transmits the selected link to the search server 10.

3-4. Functions to be Implemented by Creator Terminal

A data storage unit 400 is implemented mainly by the storage unit 32. A display control module 401 and a reception module 402 are each implemented mainly by the control unit 41. The data storage unit 400 stores an application for creating a web page. The display control module 401 displays various screens on the display unit 45. For example, the display control module 401 displays a screen of the application for creating a web page. The reception module 402 receives various operations from the operation unit 44. For example, the reception module 402 receives an operation for creating a web page by the creator and an operation for designating the title, attribute, and attribute value of the web page.

4. Processing Executed by Processing Execution System

Figure 10:
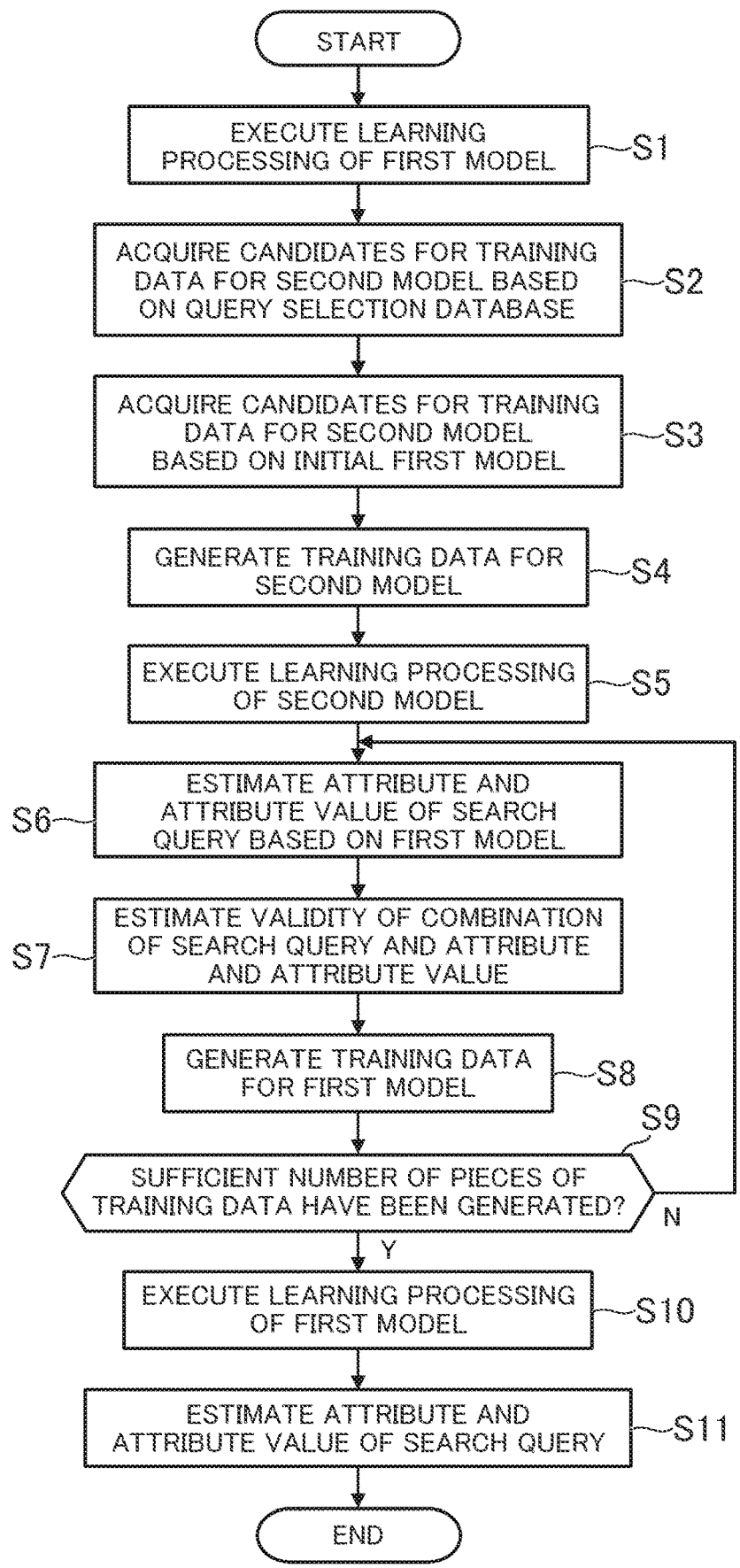
FIG. 10 is a flowchart for illustrating an example of processing executed by the processing execution system.

FIG. 10 is a flowchart for illustrating an example of processing executed by the processing execution system S. With reference to FIG. 10, processing executed by the learning server in the processing executed by the processing execution system S is described. This processing is executed by the control unit 21 operating in accordance with the program stored in the storage unit 22.

As illustrated in FIG. 10, the learning server 20 executes the learning processing of the first model M1 based on the page database DB1 (Step S1). In Step S1, the learning server 20 adjusts parameters of the first model M1 so that, when a character string indicated by the title of the web page stored in the page database DB1 is input, the attribute and attribute value associated with the title are output. The first model M1 for which the learning processing has been executed in Step S1 is the initial first model M1. For the initial first model M1, additional learning processing is executed by the processing step of Step S10 described later.

The learning server 20 acquires the candidates C1 for the training data for the second model M2 based on the query selection database DB4 (Step S2). In Step S2, the learning server 20 acquires, as the candidates C1 for the training data for the second model M2, the pairs of the search queries stored in the query selection database DB4 and the attributes and attribute values of the web pages that have been selected by the searcher who has input the search queries. In Step S2, the learning server 20 acquires all or some pairs of the query selection database DB4.

The learning server 20 acquires the candidates C2 for the training data for the second model M2 based on the initial first model M1 (Step S3). In Step S3, the learning server 20 inputs the search queries stored in the search query database DB2 to the initial first model M1, and acquires the attributes and attribute values output from the initial first model M1. The learning server 20 acquires, as the candidates C2 for the training data, the pairs of the search queries input to the first model M1 and the attributes and attribute values output from the first model M1. In Step S3, the learning server 20 inputs all or some search queries of the search query database DB2 to the learning server 20, and acquires, as the candidates C2 for the training data, the pairs of the input search queries and the attributes and attribute values output from the learning server 20.

The learning server 20 generates training data for the second model M2 based on the candidates C1 acquired in Step S2 and the candidates C2 acquired in Step S3 (Step S4). In Step S4, the learning server 20 obtains the AND of both the candidates C1 acquired in Step S2 and the candidates C2 acquired in Step S3, to thereby generate candidates C3 that are present in both thereof as the training data for the second model M2.

The learning server 20 executes the learning processing of the second model M2 based on the training data generated in Step S4 (Step S5). In Step S5, the learning server 20 adjusts parameters of the second model M2 so that, when a character string of the input portion included in the training data generated in Step S4 is input, the attribute and attribute value associated with the character string are output.

The learning server 20 estimates, based on the first model M1, the attribute and attribute value of the search query stored in the search query database DB2 (Step S6). In Step S6, the result of the processing step of Step S3 may be used as it is. The learning server 20 estimates, based on the second model M2, the validity of a combination of the search query and the attribute and attribute value acquired in Step S6 (Step S7). In Step S7, the learning server 20 inputs, to the second model M2, a pair of the search query subjected to the processing step of Step S6 and the attribute and attribute value estimated in Step S6, and acquires the estimation result for the validity output from the second model M2.

The learning server 20 generates training data for the first model M1 based on the estimation result for the validity obtained in Step S7 (Step S8). In Step S8, the learning server 20 stores the pair of the search query and the attribute and attribute value, which have been estimated as being valid in Step S7, in the training database DB3 as the training data. The learning server 20 determines whether or not a sufficient number of pieces of training data have been generated (Step S9). In Step S9, it is determined whether or not the training data generated in Step S8 has reached a predetermined number. When it is determined that a sufficient number of pieces of training data have not been generated (N in Step S9), the process returns to the processing step of Step S6 to repeat the generation of training data.

When it is determined in Step S9 that a sufficient number of pieces of training data have been generated (Y in Step S9), the learning server 20 executes the learning processing of the first model M1 based on the training database DB3 (Step S10). In Step S10, the learning server 20 adjusts parameters of the first model M2 so that, when a character string of the input portion included in the training data stored in the training database DB3 is input, the attribute and attribute value associated with the character string are output.

The learning server 20 estimates, based on the trained first model M1, the attribute and attribute value of the search query stored in the search query database DB2 (Step S11), and ends this processing. The processing step of Step S11 is the same as Step S3 and Step S6 except that the first model M1 trained in the processing step of Step S10 is used in place of the initial first model M1. The learning server 20 records the attribute and attribute value estimated in Step S11 in the storage unit 22 in association with the search query. The search query and the attribute and attribute value which have been recorded are used for any purpose. For example, the learning server 20 outputs the association of those for a marketing purpose or the like when an administrator of the processing execution system S requests to refer to the association of those.

With the processing execution system S according to this embodiment, the validity relating to the combination of the search query and the attribute and attribute value estimated by the first model M1 is estimated based on a predetermined estimation method. The processing execution system S executes the predetermined processing after estimating the validity, and hence can obtain a desired result even when the accuracy of the first model M1 is not sufficient due to insufficient training data. For example, training data for the first model M1 can be generated after the validity is estimated by executing the generation processing as the predetermined processing, thereby increasing the accuracy of the first model M1. As a result, the accuracy with which the first model M1 estimates the attribute and attribute value of the search query is increased, and hence a desired result of estimating the intention of the user can be easily obtained. In addition, for example, the training data for the first model M1 can be created from the search queries input in the past, and hence it is also possible to save the time and effort of creating training data for the first model M1.

Further, the processing execution system S estimates, based on the second model M2, the validity relating to the combination of the search query and the attribute and attribute value. This increases estimation accuracy for the validity of a combination of those. The increase in estimation accuracy for the validity also increases the accuracy of the training data for the first model M1 generated as the predetermined processing. Thus, due to the increase in estimation accuracy of the first model M1, it becomes easier to obtain a desired result.

Further, the first model M1 learns the relationship between the title of the web page and the attribute and attribute value which have been acquired based on the page database DB1. The second model M2 learns the relationship between the search query and the attribute and attribute value which have been acquired based on the query selection database DB4 obtained from a point of view different from that of the page database DB1. This increases the estimation accuracy for the validity based on the second model M2. Even when the second model M2 is caused to learn the same training data as that for the first model M1, it is considered difficult to create such a second model M2 as to identify an error in the estimation result of the first model M1. However, through use of the training data obtained from a point of view different from that of the training data used in the learning of the first model M1, the learning of the second model M2 can be performed from a point of view different from that of the learning of the first model M1. Thus, such a second model M2 as to identify an error in the estimation result of the first model M1 can be created, thereby increasing the estimation accuracy for the validity based on the second model M2. The increase in estimation accuracy for the validity based on the second model M2 also increases the accuracy of the training data for the first model M1 generated as the predetermined processing. Thus, due to the increase in estimation accuracy of the first model M1, it becomes easier to obtain a desired result.

Further, the second model M2 learns the relationship between the combination of the search query and the attribute and attribute value, which has been estimated through use of the initial first model M1, and the validity indicating that the combination is valid. As a result, a larger number of pieces of training data for the second model M2 can be generated, and hence the estimation accuracy for the validity based on the second model M2 is increased. It is also possible to save the time and effort of generating training data for the second model M2. The increase in estimation accuracy for the validity based on the second model M2 also increases the accuracy of the training data for the first model M1 generated as the predetermined processing. Thus, due to the increase in estimation accuracy of the first model M1, it becomes easier to obtain a desired result.

Further, the processing execution system S generates, based on each of the plurality of generation methods, candidates for the combination of the search query and the attribute and attribute value to be stored in the training database DB3 as the training data. The second model M2 learns, as the training data, the candidates generated by a plurality of methods among the plurality of generation methods. As a result, a larger number of pieces of training data for the second model M2 can be generated, and hence the estimation accuracy for the validity based on the second model M2 is increased. It is also possible to save the time and effort of generating training data for the second model M2. The increase in estimation accuracy for the validity based on the second model M2 also increases the accuracy of the training data for the first model M1 generated as the predetermined processing. Thus, due to the increase in estimation accuracy of the first model M1, it becomes easier to obtain a desired result.

Further, the second model M2 learns the search queries input by the user as the second data, and learns the attribute and attribute value of the search queries as the second classification information. As a result, the actually input search queries are used in the learning of the second model M2, and hence the estimation accuracy for the validity based on the second model M2 is increased. The increase in estimation accuracy for the validity based on the second model M2 also increases the accuracy of the training data for the first model M1 executed as the predetermined processing. Thus, due to the increase in estimation accuracy of the first model M1, it becomes easier to obtain a desired result.

Further, the estimation method for the validity is a method using the query selection data indicating the relationship between a search query input in the past and a result of selection from search results based on the search query. Through use of the query selection data that easily shows the intention of the user, the estimation accuracy for the validity of the combination of the search query and the attribute and attribute value is increased. The increase in estimation accuracy for the validity also increases the accuracy of the training data for the first model M1 generated as the predetermined processing. Thus, due to the increase in estimation accuracy of the first model M1, it becomes easier to obtain a desired result.

Further, the title of the web page and the attribute and attribute value thereof, which have been learned by the first model M1, are data to be used as the indexes at the time of a search. As a result, the learning processing of the first model M1 can be executed based on practical data to be used as the indexes at the time of an actual search. Thus, due to the increase in estimation accuracy of the first model M1, it becomes easier to obtain a desired result.

Further, the attribute and attribute value, which are the second classification information, are estimated as the information relating to the intention of the user who has input the search query. As a result, the intention of the user who has input the search query can be estimated. For example, when the intention of the user who has input the search query is estimated, the estimated intention can be utilized for marketing in the search service and can increase the accuracy of the search results.

Further, the generation processing for generating training data for the first model M1 to learn is executed based on the combination of the search query and the attribute and attribute value and the estimation result for the validity. As a result, due to the increase in estimation accuracy of the first model M1, it becomes easier to obtain a desired result. It is also possible to save the time and effort of creating training data for the first model M1.

Further, the first model M1 is a multi-label model which has learned the relationship between the title of the web page and a plurality of attributes and attribute values. Thus, a plurality of attributes and attribute values can be associated with the search query input by the user. As a result, due to the increase in estimation accuracy of the first model M1, it becomes easier to obtain a desired result.

5. Modification Examples

The present disclosure is not limited to the embodiment described above, and modifications can be made as appropriate within a scope that does not depart from the spirit of the present disclosure.

5-1. Modification Example 1

For example, in the embodiment, the case in which the second model M2 outputs, as the estimation result, the binary information indicating whether or not there is a validity for the combination of the search query and the attribute and attribute value has been described, but the second model M2 may output a score relating to the validity of the combination as the estimation result. The score is as described in the embodiment. In Modification Example 1, there is described a case in which the score is represented by a number. The higher score means the higher validity. The score can be said to be a probability or a likelihood. For example, when a combination of the search query and the attribute and attribute value is input, the second model M2 outputs the score of the combination as the estimation result.

The validity estimation module 206 in Modification Example 1 acquires the score output from the second model M2 based on the combination of the search query and the attribute and attribute value, and estimates the validity based on the acquired score. For example, the validity estimation module 206 estimates that the combination of the search query and the attribute and attribute value is not valid when the score output from the second model M2 is smaller than a threshold value, and estimates that the combination of the search query and the attribute and attribute value is valid when the score output from the second model M2 is equal to or larger than the threshold value.

According to Modification Example 1, the score output from the second model M2 is acquired based on the combination of the search query and the attribute and attribute value, and the validity is estimated based on the acquired score. In place of outputting the binary information indicating the fact of being valid or not, the second model M2 outputs the score, which indicates the level of validity, and can assume an intermediate value, thereby facilitating utilization of the estimation result of the second model M2. For example, it becomes easier to understand, due to the value of the score, what certainty the second model M2 is valid with. As a result, the accuracy of the training data for the first model M1 executed as the predetermined processing is also increased. For example, as the score of the second model M2 acquired in order to generate training data for the first model M1 becomes higher, the larger weight can be put on the first model M1. In this case, the first model M1 can be caused to learn the highly valid training data. As a result, due to the increase in estimation accuracy of the first model M1, it becomes easier to obtain a desired result.

5-2. Modification Example 2

For example, the estimation method may be a method using a cosine similarity which is based on the search query and the attribute and attribute value. The cosine similarity is a method of calculating a similarity between character strings. For example, when a similarity or dissimilarity between a first character string and a second character string is to be determined, a cosine similarity is calculated based on an angle formed by a first vector indicating a feature of the first character string and a second vector indicating a feature of the second character string. As the first vector and the second vector become closer in direction, the cosine similarity therebetween becomes higher. That is, as the search query and the attribute and attribute value become closer in feature, the cosine similarity therebetween becomes higher.

The validity estimation module 206 estimates the validity based on the cosine similarity, which is based on the search query and the attribute and attribute value. The validity estimation module 206 calculates the cosine similarity between the first vector indicating the feature of the search query and the second vector indicating the feature of the attribute and attribute value. The first vector and the second vector may be calculated by the same second model M2 as that in the embodiment, or may be calculated by another model such as Word2Vec or Doc2Vec. As the cosine similarity calculation method itself, various calculation methods employed by the natural language processing can be applied.

For example, the validity estimation module 206 estimates that the combination of the search query and the attribute and attribute value is not valid when the cosine similarity based on the search query and the attribute and attribute value is smaller than a threshold value, and estimates that the combination of the search query and the attribute and attribute value is valid when the cosine similarity based on the search query and the attribute and attribute value is equal to or larger than the threshold value. Modification Example 1 and Modification Example 2 may be combined to use the cosine similarity as the score described in Modification Example 1. In place of using the cosine similarity, another index for comparison between vectors, such as a Euclidean distance, may be used.

According to Modification Example 2, the validity of the estimation result of the first model M1 is estimated based on the cosine similarity. Through use of the cosine similarity, which is relatively easy to be calculated, it is possible to speed up the processing of the processing execution system S.

5-3. Modification Example 3

For example, the validity estimation module 206 may estimate the validity based on each of a plurality of estimation methods. The plurality of estimation methods are exemplified by the estimation method described in the embodiment, the estimation method described in Modification Example 1, and the estimation method described in Modification Example 2. The plurality of estimation methods are also exemplified by, for example, estimation methods described below. In Modification Example 3, the estimation methods can be freely combined.

For example, the validity estimation module 206 may estimate the validity based on an estimation method using a dictionary. For example, the dictionary defines a relationship between each attribute and a specific character string of each attribute value. The validity estimation module 206 estimates that the estimation result of the first model M1 is not valid when the attribute and attribute value output by the first model M1 are not present in the dictionary, and estimates that the estimation result of the first model M1 is valid when the attribute and attribute value output by the first model M1 are present in the dictionary.

In the estimation method using the dictionary, any dictionary can be used, and a dictionary other than the above-mentioned dictionary may be used. For example, the validity estimation module 206 may estimate the validity based on a dictionary which defines a relationship between each search query and each valid attribute and attribute value. In this case, the validity estimation module 206 estimates that the estimation result of the first model M1 is not valid when a combination of a search query input to the first model M1 and the attribute and attribute value output from the first model M1 is not present in the dictionary, and estimates that the estimation result of the first model M1 is valid when this combination is present in the dictionary.

In addition, for example, the validity estimation module 206 may estimate the validity based on an estimation method using a multi-label classification tool such as extremeText. In this case, the validity estimation module 206 inputs the combination of the search query and the attribute and attribute value to the classification tool to estimate that this combination is not valid when a score output from the classification tool is smaller than a threshold value and estimate that this combination is valid when this score is equal to or larger than the threshold value.

The execution module 207 executes the generation processing based on estimation results for the validity respectively obtained by a plurality of estimation methods. The execution module 207 executes the generation processing in comprehensive consideration of the estimation results for the validity respectively obtained by the plurality of estimation methods. That is, the execution module 207 may execute the generation processing through use of a statistical index based on the estimation results for the validity respectively obtained by the plurality of estimation methods. For example, the execution module 207 stores, in the training database DB3, the combination of the search query and the attribute and attribute value for which the number of estimation methods by which it has been estimated that there is a validity is equal to or larger than a predetermined number. The combination of the search query and the attribute and attribute value for which the number of estimation methods by which it has been estimated that there is a validity is smaller than the predetermined number is not to be used as the training data.

For example, the execution module 207 may generate training data based on a majority decision by the respective plurality of estimation methods and store the training data in the training database DB3. When there are five estimation methods, the execution module 207 estimates the validity of the combination of the search query and the attribute and attribute value based on the five respective estimation methods. That is, the execution module 207 acquires five estimation results. When three or more estimation results obtained out of the five estimation results indicate that there is a validity, the execution module 207 generates training data indicating that the combination of the search query and the attribute and attribute value is valid, and stores the training data in the training database DB3.

For example, the execution module 207 may generate training data based on an average value of the respective plurality of estimation methods, and store the training data in the training database DB3. When there are five estimation methods, the execution module 207 estimates the validity of the combination of the search query and the attribute and attribute value based on the five estimation methods. That is, the execution module 207 acquires five estimation results. The execution module 207 generates training data that is a pair of the combination of the search query and the attribute and attribute value and the average value of the five estimation results, and stores the training data in the training database DB3. For example, when three estimation results obtained out of the five estimation results indicate that there is a validity, the average value is 0.6. This average value indicates the level of validity. As a model for using a plurality of estimation methods in an integrated manner, a programmable labeling model such as Snorkel may be used.

For example, the execution module 207 may calculate a score indicating a comprehensive estimation result based on the estimation results for the validity respectively obtained by the plurality of estimation methods. In this case, the execution module 207 does not execute the generation processing when this comprehensive score is smaller than a threshold value, and executes the generation processing when the comprehensive score is equal to or larger than the threshold value. For example, the execution module 207 may determine a weight based on the number of estimation methods by which it has been estimated that there is a validity or the comprehensive score. In this case, the weight is determined so that, as the number of estimation methods by which it has been estimated that there is a validity becomes larger or as the comprehensive score becomes higher, the training data is learned by the first model M1 more intensively.

According to Modification Example 3, the validity is estimated based on the respective plurality of estimation methods, and the generation processing is executed based on the estimation results for the validity respectively obtained by the plurality of estimation methods. As a result, the validity of the search query and the attribute and attribute value is estimated in comprehensive consideration of the plurality of estimation methods, thereby increasing the estimation accuracy for the validity. The increase in estimation accuracy for the validity based on the second model M2 also increases the accuracy of the training data for the first model M1 executed as the predetermined processing.

Thus, due to the increase in estimation accuracy of the first model M1, it becomes easier to obtain a desired result. For example, as the number of estimation methods used for estimating the validity becomes larger, the accuracy of the training data for the first model M1 is increased. Meanwhile, when the number of estimation methods is too large and a criterion of each individual estimation method is strict, there is a possibility that, due to a small amount of training data for the first model M1, a sufficient number of pieces of training data cannot be obtained for the learning of the first model M1. Thus, the accuracy of the training data for the first model M1 and the number of pieces of training data for the first model M1 are considered to have a trade-off relationship.

5-4. Modification Example 4

For example, in the embodiment, the case in which the processing execution system S is applied to the search service for web pages has been described, but the processing execution system S can be applied to any service. For example, the processing execution system S can be used for an electronic commerce service, a travel booking service, an Internet auction service, a facility reservation service, a social networking service (SNS), a financial service, an insurance service, a moving image distribution service, or a communication service. In Modification Example 4, there is described a case in which the processing execution system S is applied to the electronic commerce service. In Modification Example 4, a product page on which a product appears corresponds to the web page described in the embodiment.

The first data in Modification Example 4 is a product title to be used as an index at the time of a search for a product. The product title is a character string which briefly describes a product. For example, in addition to the product title, product description text is prepared. The product title is shorter in length than the product description text. For example, while the product title has a character string of from about several characters to about 100 characters, the product description text has a character string of from about several tens of characters to about several thousands of characters. The product title is created by a person in charge of a shop. Thus, in Modification Example 4, the person in charge of the shop in the electronic commerce service corresponds to the creator. The searcher is a user who uses the electronic commerce service to purchase the product.

The first classification information in Modification Example 4 is product attribute information to be used as the index at the time of a search for a product. The product attribute information is information relating to an attribute of a product. The product attribute information indicates at least one of an attribute or an attribute value. In Modification Example 4, there is described a case in which the product attribute information indicates both the attribute and the attribute value, but the product attribute information may indicate any one of the attribute or the attribute value. For example, the attribute of the product is the genre or category of the product. For example, the attribute of the product may be a feature, such as the color, size, texture pattern, or shape, of the product.

In the page database DB1 in Modification Example 4, the title of the product and the attribute and attribute value of the product are stored in association with each other. The initial first model M1 has learned a relationship between the title of the product and the attribute and attribute value of the product. The search query database DB2 stores, as the second data and the third data, search queries input in the past in the electronic commerce service. The second classification information acquisition module 202 acquires the attribute and attribute value corresponding to each of the search queries stored in the search query database DB2, based on the first model M1 as the second classification information.

The second model M2 has learned a relationship between a combination of a search query input in the past and the attribute and attribute value of each product and the validity of this combination. The validity estimation module 206 inputs, to the second model M2, the combination of a search query input to the first model M1 and the attribute and attribute value of the product output from the first model M1. The validity estimation module 206 estimates the validity of a combination of those by acquiring output from the second model M2. The execution module 207 determines, based on the validity estimated by the validity estimation module 206, whether or not to generate a combination of those as the training data for the first model M1.

According to Modification Example 4, the first data is the product title to be used as the index at the time of a search for the product, and the first classification information is the product attribute information to be used as the index at the time of a search for the product. As a result, even when the processing execution system S is applied to the electronic commerce service, it is possible to obtain a desired result. For example, the intention of the search query input by the user who uses the electronic commerce service can be estimated. As a result, the estimated intention can be utilized for marketing in the electronic commerce service and can increase the accuracy of the search results in the electronic commerce service.

5-5. Modification Example 5

For example, the predetermined processing executed by the execution module 207 is not limited to the generation processing described in the embodiment. The execution module 207 may execute, as the predetermined processing, search processing corresponding to a search query based on the estimation result for the validity. In Modification Example 5, when the user inputs a search query, the processing of the second classification information acquisition module 202, the validity estimation module 206, and the execution module 207 is executed. The second classification information acquisition module 202 acquires the attribute and attribute value corresponding to the search query input by the user based on the first model M1. This first model M1 may be a model trained by the same method as that in the embodiment, or may be a model trained by another method.

The validity estimation module 206 estimates the validity of a combination of the search query and the attribute and attribute value. The estimation method for the validity is the same as that in the embodiment. When it is estimated that this combination is not valid, the execution module 207 executes the search processing based on the search query input by the user without using the attribute and attribute value estimated by the first model M1 in the search processing. When it is estimated that this combination is valid, the execution module 207 executes the search processing so that the attribute and attribute value estimated by the first model M1 are used as the search query. In this case, the character string input as the search query input by the user and the attribute and attribute value estimated by the first model M1 are used as the search query.

According to Modification Example 5, the search processing corresponding to the search query is executed based on the estimation result for the validity. As a result, not only the search query input by the user but also the estimation result of the first model M1 estimated as being valid can be used in the search processing, thereby increasing the accuracy of the search processing.

5-6. Modification Example 6

For example, the execution module 207 may execute, as the predetermined processing, output processing for outputting the search query and the attribute and attribute value based on the estimation result for the validity. The execution module 207 outputs the combination of the search query and the attribute and attribute value estimated as being valid to a terminal of the administrator of the processing execution system S. The execution module 207 may output the estimation result for the validity and the combination of the search query and the attribute and attribute value to the terminal of the administrator. The output to the terminal of the administrator may be performed by displaying an image, or may be performed by outputting data.

According to Modification Example 6, the output processing for outputting the search query and the attribute and attribute value is executed based on the estimation result for the validity. As a result, the administrator can be notified of a relationship between the search query and the attribute and attribute value, and hence the relationship can be utilized for marketing or the like.

5-7. Modification Example 7

For example, in the embodiment, the case in which the second data is the search query for a web page has been described, but the second data may be data relating to a post by a user. The post includes at least one of text or an image. In Modification Example 7, there is described a case in which the user submits a post to an SNS, but the user may submit a post to any service. Examples thereof may include a post to an Internet encyclopedia, a post to a bulletin board, and a comment on a news article. The post itself to an SNS may be any one of various posts, and may be, for example, a short text post, an image, a moving image, or a combination of those.

The second classification information is information relating to a classification of a post. In Modification Example 7, a case in which this classification is information referred to as "hashtag" is taken as an example, but the second classification information in Modification Example 7 may be information other than the hashtag. In Modification Example 7, when the user uploads a post, the processing of the second classification information acquisition module 202, the validity estimation module 206, and the execution module 207 is executed. The second classification information acquisition module 202 acquires, based on the first model M1, a hashtag corresponding to the post by the user. It is assumed that the first model M1 in Modification Example 7 has learned a relationship between each post uploaded to an SNS in the past and each hashtag added to this post. This first model M1 may be a model trained by the same method as that in the embodiment, or may be a model trained by another method.

The validity estimation module 206 estimates the validity of a combination of the post by the user and the hashtag. The estimation method for the validity is the same as that in the embodiment. When it is estimated that this combination is not valid, the execution module 207 does not add the hashtag estimated by the first model M1 to the post by the user. When it is estimated that this combination is valid, the execution module 207 adds the hashtag estimated by the first model M1 to the post by the user.

According to Modification Example 7, the second data is the data relating to the post by the user, and the second classification information is the information relating to the classification of the post. As a result, even when the processing execution system S is applied to, for example, an SNS, it is possible to obtain a desired result. For example, an appropriate hashtag can be added to the post submitted by the user.

5-8. Modification Example 8

For example, the estimation method for the validity performed by the validity estimation module 206 is not limited to the methods described in the embodiment and Modification Examples 1 to 7. In Modification Example 8, another example of the estimation method is described. In Modification Example 8, in the same manner as in Modification Example 4, there is described a case in which the processing execution system S is applied to the electronic commerce service, but the estimation method in Modification Example 8 can be applied to any service other than the electronic commerce service.

Figure 11:
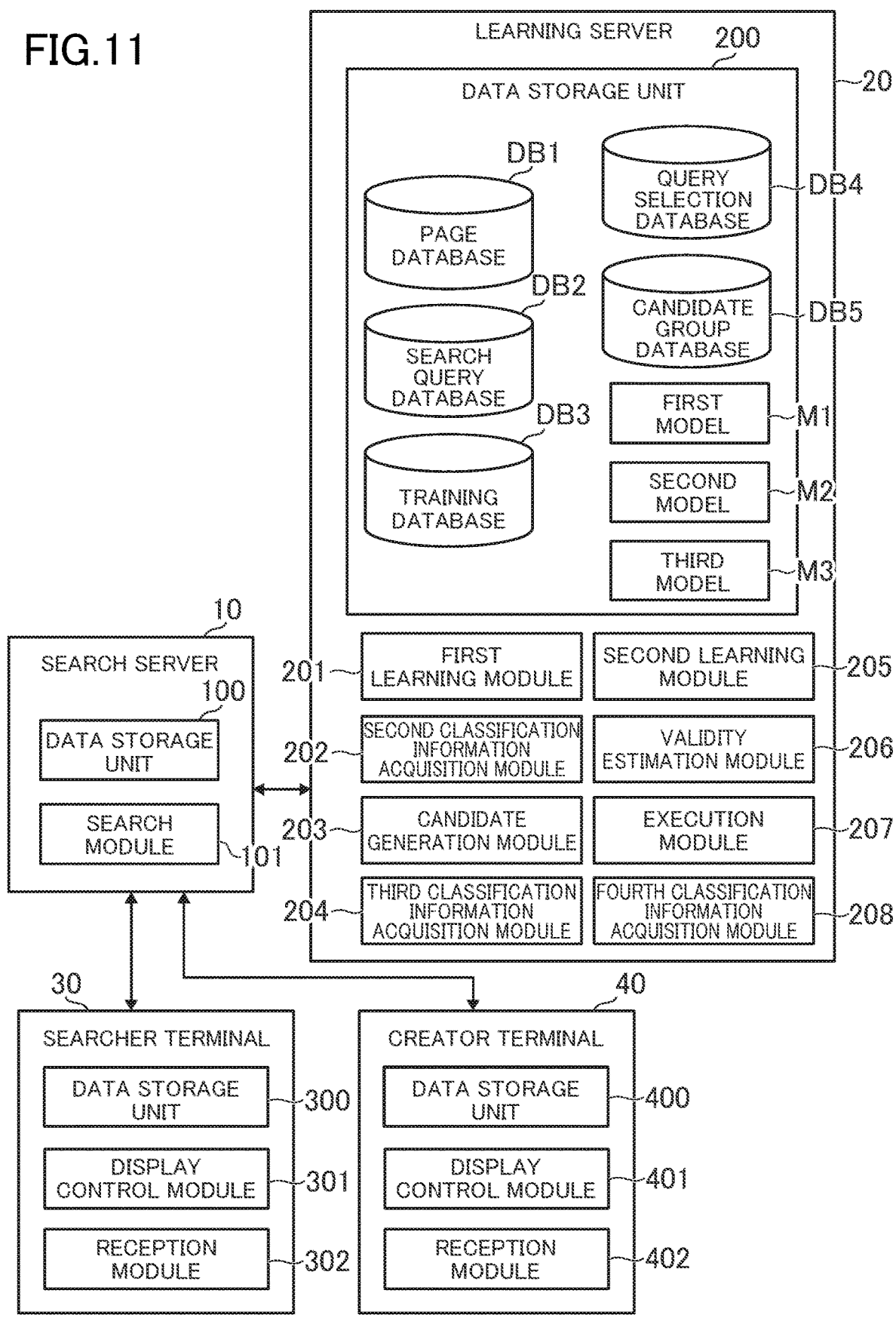
FIG. 11 is a diagram for illustrating an example of functional blocks in Modification Example 8.

FIG. 11 is a diagram for illustrating an example of functional blocks in Modification Example 8. As illustrated in FIG. 11, in Modification Example 8, a fourth classification information acquisition module 208 is implemented in addition to the functions described in the embodiment and Modification Examples 1 to 7. The other functions may be the same as those of the embodiment and Modification Examples 1 to 7, but the data storage unit 200 differs in that the data storage unit 200 stores a candidate group database DB5 and a third model M3. The details of the candidate group database DB5 and the third model M3 are described later.

Figure 12:
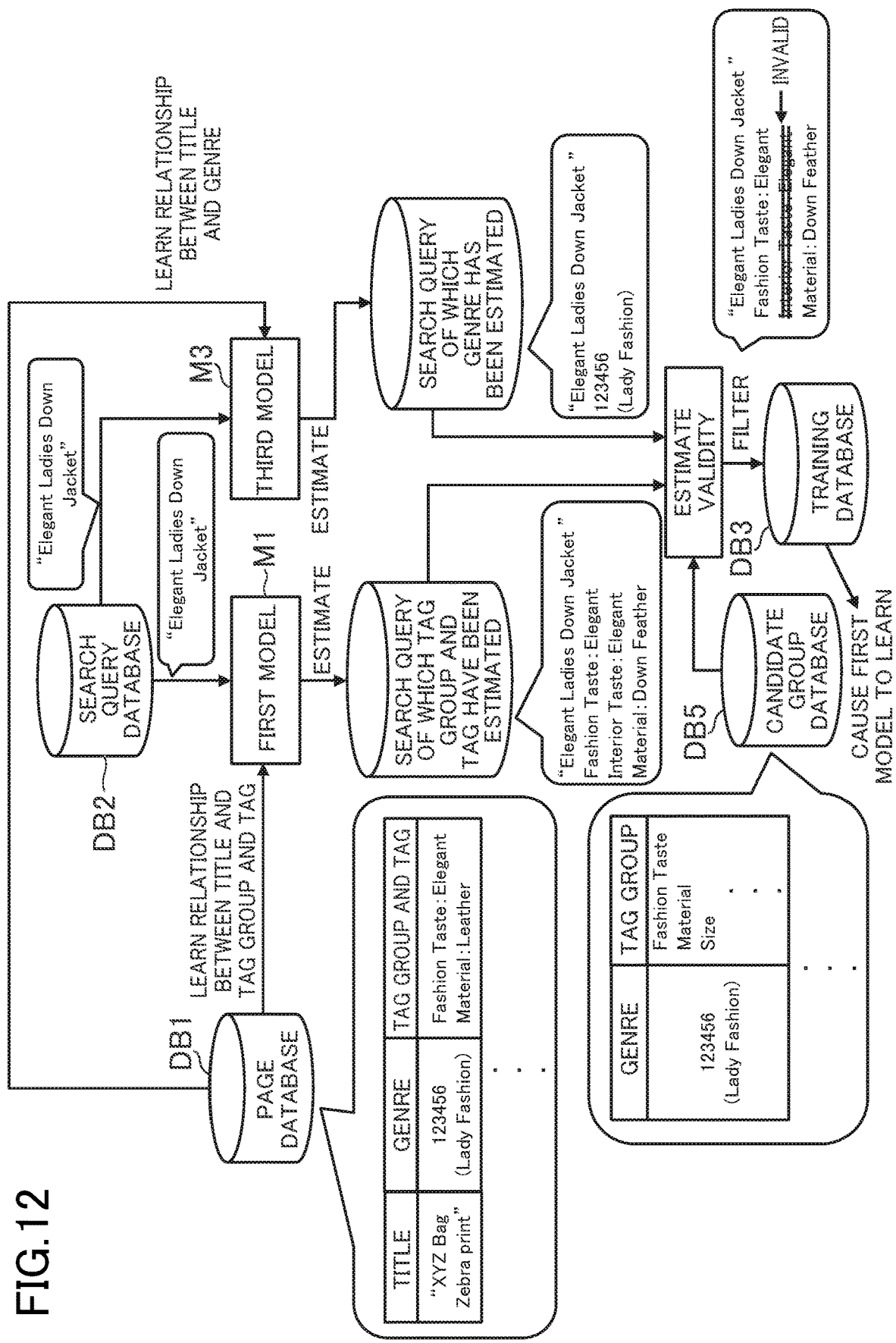
FIG. 12 is a diagram for illustrating an outline of processing executed in Modification Example 8.

FIG. 12 is a diagram for illustrating an outline of processing executed in Modification Example 8. As illustrated in FIG. 12, in the page database DB1 in Modification Example 8, the title of a product which can be purchased in the electronic commerce service, the genre of the product, a tag group of the product, and a tag of the product are associated with each other. The genre, tag group, and tag are examples of the classifications of the product. In Modification Example 8, there is described a case in which the data stored in the page database DB1 is used as the training data for both the first model M1 and the third model M3.

The genre of the product is the type of the product. The genre of the product may also be referred to as "category of the product." The tag group is an example of the attribute described in Modification Example 4. The tag of the product is an example of the attribute value described in Modification Example 4. In Modification Example 8, the tag group and tag are the classification obtained from a point of view different from that of the genre or category. The tag group and tag are not the type of the product itself but information indicating the feature, such as the color, texture pattern, size, or shape, of the product. There are a plurality of combinations of the tag group and the tag even for products of the same genre.

The first learning module 201 in Modification Example 8 executes the learning processing of the first model M1 based on a relationship between the title of the product stored in the page database DB1 and the tag group and tag of the product. When the title of a certain product is input, the first learning module 201 executes the learning processing of the first model M1 so as to output the tag group and tag of this product. In the example of FIG. 12, a product of a genre "123456" (genre ID meaning "Lady Fashion") is illustrated, but it is assumed that the page database DB1 stores data on products of various genres and the first model M1 learns the products of the various genres. The genre ID is an ID that can identify a genre. The genre ID is represented by a number, another symbol, or a combination of those. The genre may be represented by a character string.

The second classification information acquisition module 202 in Modification Example 8 inputs a search query stored in the search query database DB2 to the first model M1, and acquires the tag group and tag output from the first model M1 as the second classification information. The second classification information in Modification Example 8 indicates a combination of the tag group and tag relating to the search query. The tag group of the search query is an example of a first attribute. The tag of the search query is an example of a first attribute value. Thus, the tag group of the search query as used herein can be read as the first attribute. The tag of the search query as used herein can be read as the first attribute value. The meanings of the attribute and attribute value are the same as those described in the embodiment or Modification Example 4.

In the example of FIG. 12, the second classification information acquisition module 202 inputs a search query "Elegant Ladies Down Jacket" to the first model M1, and acquires a combination of three tag groups and tags output from the first model M1 as three pieces of second classification information. The first piece of second classification information is a combination of a tag group "Fashion Taste" and a tag "Elegant." The second piece of second classification information is a combination of a tag group "Interior Taste" and a tag "Elegant." The third piece of second classification information is a combination of a tag group "Material" and a tag "Down Feather."

In Modification Example 8, the search query is input not only to the first model M1 but also to the third model M3. The third model M3 is a model that has learned the relationship between the title of the product stored in the page database DB1 and the genre of the product. In Modification Example 8, there is described a case in which a product used as the training data for the first model M1 and a product used as training data for the third model M3 are the same, but those products may differ from each other. That is, the third model M3 may learn a relationship between the title of another product different from the product learned by the first model M1 and the genre of the another product. The title of the another product is an example of fourth data. The fourth data is data different from the first data. The third model M3 may be any data that has learned a relationship between the first data or fourth data and fourth classification information on the first data or fourth data.

For example, the fourth classification information acquisition module 208 acquires, based on the third model M3, the fourth classification information relating to the classification of the search query obtained from a point of view different from that of the second classification information. The genre of the search query is an example of the fourth classification information. Thus, the genre of the search query as used herein can be read as the fourth classification information. In Modification Example 8, the fourth classification information indicates a second attribute obtained from a point of view different from that of the first attribute. The genre is also an example of the second attribute. The second attribute may be not only the genre but also another attribute described in the embodiment or Modification Example 4.

The fourth classification information may be any classification obtained from a point of view different from that of the second classification information, and is not limited to the genre. The fourth classification information is only required to indicate a classification corresponding to a situation to which the processing execution system S is applied. For example, when the processing execution system S is applied to the classification of such a web page as described in the embodiment and the web page provides an academic paper, a technical field indicated by the paper may correspond to the fourth classification information. As another example, when the processing execution system S is applied to the classification of a web page in a travel booking system, the type of a travel product such as a hotel, a tour, a highway bus, or an optional tour may correspond to the fourth classification information.

The fourth classification information acquisition module 208 inputs a search query to the third model M3, and acquires the genre output from the third model M3 as the fourth classification information. The third model M3 has learned the relationship between the title of the product and the genre thereof, and hence the genre that presupposes that the search query is the title of the product is estimated. In other words, the genre of the product for which the user who has input the search query intends to search is estimated. In the example of FIG. 12, the fourth classification information acquisition module 208 inputs the search query "Elegant Ladies Down Jacket" to the third model M3, and acquires the genre "123456" (genre ID meaning "Lady Fashion") output from the third model M3 as the fourth classification information.

In Modification Example 8, the estimation method for the validity is to determine whether or not the second classification information and the fourth classification information correspond to each other. The condition that the second classification information and the fourth classification information correspond to each other means that the second classification information is appropriate as the classification indicated by the fourth classification information. In contrast, the condition that the fourth classification information is appropriate as the classification indicated by the second classification information may correspond to the condition that the second classification information and the fourth classification information correspond to each other. For example, when the fourth classification information indicates the genre such as "123456" of FIG. 12, there are various sizes for women fashion goods, and hence the second classification information indicating the tag group "Size" corresponds to the fourth classification information. Meanwhile, it is in principle unthinkable to use women fashion goods as interior goods, and hence the second classification information indicating the tag group "Interior Taste" does not correspond to the fourth classification information.

In Modification Example 8, an association between the second classification information and the fourth classification information is defined in the candidate group database DB5. A combination of the second classification information and the fourth classification information which are defined in the candidate group database DB5 satisfies the condition that the second classification information and the fourth classification information correspond to each other. The association between the second classification information and the fourth classification information may be defined by the administrator of the processing execution system S by himself or herself, or an association between the genre and tag group of the product page in the electronic commerce service may be used as it is. The association between the second classification information and the fourth classification information may be defined in a database other than the candidate group database DB5, or there may be a learning model that determines whether or not the association between those is appropriate. It is assumed that this learning model has learned combinations of the second classification information and the fourth classification information which correspond to each other.

As illustrated in FIG. 12, the candidate group database DB5 is a database in which each candidate group relating to the second classification information is associated with each candidate relating to the fourth classification information. For example, tag groups appropriate for products of one certain genre are defined in the candidate group database DB5. In the example of FIG. 12, the tag groups "Fashion Taste," "Material," and "Size," which are appropriate for the products of the genre "123456," are defined. In regard to other genres, tag groups appropriate for the other genres are defined in the candidate group database DB5 in the same manner. In the candidate group database DB5, not only tag groups but also tags may be defined. In this case, appropriate combinations of the genre and the tag group and tag are defined in the candidate group database DB5.

The validity estimation module 206 determines whether or not the second classification information and the fourth classification information correspond to each other, and estimates the validity based on a result of the determination. When the validity estimation module 206 does not determine that the second classification information and the fourth classification information correspond to each other, the validity estimation module 206 determines that the tag group and tag estimated for the search query are not valid (that is, are invalid). When the validity estimation module 206 determines that the second classification information and the fourth classification information correspond to each other, the validity estimation module 206 determines that the tag group and tag estimated for the search query are valid.

For example, the validity estimation module 206 determines whether or not the second classification information corresponds to the fourth classification information based on the candidate group database DB5. That is, the validity estimation module 206 determines whether or not the tag group indicated by the second classification information and the genre indicated by the fourth classification information correspond to each other. When the combination of the genre estimated for the search query and the tag group estimated for the search query is present in the candidate group database DB5, the validity estimation module 206 determines that the tag group and tag estimated for the search query are valid.

In the example of FIG. 12, of three tag groups "Fashion Taste," "Interior Taste," and "Material" indicated by three pieces of second classification information, two tag groups "Fashion Taste" and "Material" are associated with the genre "123456" of the search query in the candidate group database DB5, and hence correspond to this genre. Meanwhile, the tag group "Interior Taste" is not associated with the genre "123456" of the search query in the candidate group database DB5, and hence does not correspond to this genre.

Thus, the validity estimation module 206 estimates that the combination of the tag group "Fashion Taste" and the tag "Elegant," which is the first piece of second classification information, and the combination of the tag group "Material" and the tag "Down Feather," which is the third piece of second classification information, are valid. The validity estimation module 206 estimates that the combination of the tag group "Material" and the tag "Elegant," which is the second piece of second classification information, is invalid. The second classification information estimated as being valid may be used for the same purpose as those in the embodiment and Modification Examples 1 to 7. In the example of FIG. 12, the second classification information estimated as being valid is used for the learning of the first model M1.

An acquisition method for the fourth classification information is not limited to the method using the third model M3. It suffices that the fourth classification information acquisition module 208 acquires the fourth classification information based on a predetermined acquisition method. As another example of the acquisition method, a database in which a relationship between a detail that can be input as a search query and a genre appropriate for this detail is defined may be used in place of the model which uses machine learning. In this case, the fourth classification information acquisition module 208 refers to this database to acquire the genre associated with the search query as the fourth classification information. It suffices that a perfect match or a partial match is determined between the search query and the detail stored in the database.

Further, the fourth classification information may indicate genres having a hierarchical structure. The hierarchical structure can be said to be a tree structure. The classification indicated by a genre at a higher hierarchical level becomes broader, while the classification indicated by a genre at a lower hierarchical level becomes more detailed. The number of products becomes larger as the hierarchical level becomes higher, while the number of products becomes smaller as the hierarchical level becomes lower. For the genre "123456" of FIG. 12, a genre ID indicating "Fashion" is present as a higher-level genre. In addition, genre IDs indicating genres such as "Tops," "Bottoms," and "One-piece" are present as lower-level genres.

When genres have a hierarchical structure, a high-level genre and a low-level genre has a one-to-many relationship in principle. The genres may have any number of hierarchical levels as long as the number of hierarchical levels is two or more. It is assumed that relationships between genres having various hierarchical levels and tag groups appropriate for the genres at those hierarchical levels are defined in the candidate group database DB5. For example, as the level of a genre becomes higher, more lower-level genres are present under the genre, and hence the number of corresponding tag groups becomes larger. As the level of a genre becomes lower, less or no lower-level genres are present under the genre, and hence the number of corresponding tag groups becomes smaller.

For example, when the validity estimation module 206 determines that the second classification information and the fourth classification information correspond to each other, the validity estimation module 206 estimates the certainty of the validity based on the hierarchical level of the fourth classification information determined to correspond to the second classification information. For example, the validity estimation module 206 sets the certainty of the validity higher as the hierarchical level of the fourth classification information determined to correspond to the second classification information becomes lower. The validity estimation module 206 sets the certainty of the validity lower as the hierarchical level of the fourth classification information determined to correspond to the second classification information becomes higher. For example, the certainty of the validity is stored in the training database DB3. In the learning processing of the first model M1, only pieces of training data having the certainty equal to or larger than a threshold value may be used, or a predetermined number of pieces of training data in descending order of the certainty may be used.

According to Modification Example 8, it is determined whether or not the second classification information on the search query and the fourth classification information on the search query correspond to each other, and the validity of the combination of the search query and the second classification information is estimated based on a result of the determination. This increases the estimation accuracy for the validity. For example, the validity can be estimated by processing having a relatively small amount of calculation, and hence it is possible to reduce a processing load on the learning server 20 and to speed up the processing for estimating the validity.

Further, the processing execution system S acquires the fourth classification information based on the third model M3. As a result, even for an unknown search query (search query having a character string different from that of the title of the product stored in the page database DB1), it is possible to estimate the fourth classification information. Thus, it is possible to estimate the validity of the second classification information estimated for the unknown search query.

Further, the processing execution system S determines whether or not the second classification information corresponds to the fourth classification information based on the candidate group database DB5 in which each candidate group relating to the second classification information is associated with each candidate relating to the fourth classification information. As a result, it is possible to accurately determine whether or not the second classification information corresponds to the fourth classification information. In addition, it is only required to be determined whether or not the combination of the second classification information on the search query and the fourth classification information on the search query is present in the candidate group database DB5, and hence the validity of whether the combination of the search query and the second classification information can be determined by processing having a smaller amount of calculation. Thus, it is possible to reduce the processing load on the learning server 20 and to speed up the processing for estimating the validity.

Further, the processing execution system S determines whether or not the tag group indicated by the second classification information and the genre indicated by the fourth classification information correspond to each other. As a result, when classifications obtained from a plurality of points of view are associated with the product as in the electronic commerce service, the validity of the combination of the search query and the second classification information can be accurately estimated through use of whether or not a combination of the classifications obtained from the plurality of points of view is appropriate.

Further, when it is determined that the second classification information and the fourth classification information correspond to each other, the processing execution system S estimates the certainty of the validity based on the hierarchical level of the fourth classification information determined to correspond to the second classification information. As a result, the validity of the combination of the search query and the second classification information can be accurately estimated through use of the hierarchical structure.

5-9. Other Modification Examples

For example, the modification examples described above may be combined.

For example, the functions described as being implemented by the search server 10 may be implemented by another computer, or may be distributed among a plurality of computers. The functions described as being implemented by the learning server 20 may be implemented by another computer, or may be distributed among a plurality of computers. For example, the data described as being stored in the data storage units 100 and 200 may be stored in a database server.

The invention claimed is:

1. A processing execution system, comprising at least one processor configured to:
input first data into a first machine learning model and acquire first classification information as an output of the first machine learning model;
input second data into the first machine learning model and acquire second classification information related to a classification of the second data as an output of the first machine learning model;
wherein the first machine learning model has learned a relationship between the first data and the first classification information, which indicates an attribute of the first data;
estimate, based on a predetermined estimation method, a validity relating to a combination of the second data and the second classification information;
execute predetermined processing based on an estimation result for the validity;
wherein the predetermined estimation method comprises a method using a second model which has learned a relationship between a combination of third data and third classification information indicating an attribute of the third data and a validity of the combination,
wherein the at least one processor is configured to estimate the validity based on the second model;
wherein the first model is configured to learn a relationship between the first data and the first classification information,
wherein the first data and the first classification information have been acquired based on a first database including candidates for the first data and candidates for the first classification information, and
wherein the second model is configured to learn a relationship between the third data and the third classification information,
wherein the third data and the third classification information have been acquired based on a second database including candidates for the third data and candidates for the third classification information, the second database having been obtained from a point of view different from a point of view of the first database.

2. The processing execution system according to claim 1, wherein the at least one processor is configured to acquire the third classification information based on the third data and the first model, and
wherein the second model is configured to learn a relationship between the combination of the third data and the third classification information and a validity indicating that the combination is valid.

3. The processing execution system according to claim 1, wherein the at least one processor is configured to generate candidates for the third data and the third classification information based on each of a plurality of generation methods,
wherein the second model learns, as the third data and the third classification information, the candidates generated by a plurality of methods among the plurality of generation methods.

4. The processing execution system according to claim 1, wherein the at least one processor is configured to acquire a score output from the second model based on the combination of the second data and the second classification information, and estimate the validity based on the acquired score.

5. The processing execution system according to claim 1,
wherein the predetermined estimation method comprises a method using a cosine similarity which is based on the second data and the second classification information, and
wherein the at least one processor is configured to estimate the validity based on the cosine similarity.

6. The processing execution system according to claim 1,
wherein the second data comprises a search query input by a user, and
wherein the second classification information comprises information relating to a classification of the search query.

7. The processing execution system according to claim 6,
wherein the predetermined estimation method comprises a method using query selection data indicating a relationship between a search query input in a past and a result of selection from search results based on the search query, and
wherein the at least one processor is configured to estimate the validity based on the query selection data.

8. The processing execution system according to claim 6, wherein the first data and the first classification information comprise data to be used as an index at a time of a search.

9. The processing execution system according to claim 6, wherein the second classification information comprises information relating to an intention of the user who has input the search query.

10. The processing execution system according to claim 6, wherein the at least one processor is configured to execute, as the predetermined processing, search processing corresponding to the search query based on the estimation result for the validity.

11. The processing execution system according to claim 1,
wherein the first model comprises a multi-label model,
wherein the at least one processor is configured to acquire a plurality of pieces of the second classification information based on the first model,
wherein the at least one processor is configured to estimate the validity for each of the plurality of pieces of the second classification information, and
wherein the at least one processor is configured to execute the predetermined processing based on the validity of each of the plurality of pieces of the second classification information.

12. The processing execution system according to claim 1, wherein the at least one processor is configured to acquire, based on a predetermined acquisition method, fourth classification information relating to a classification of the second data obtained from a point of view different from a point of view of the second classification information,
wherein the predetermined estimation method comprises determining whether the second classification information and the fourth classification information correspond to each other, and
wherein the at least one processor is configured to determine whether the second classification information and the fourth classification information correspond to each other, and estimate the validity based on a result of the determination.

13. A processing execution system, comprising at least one processor configured to:
input first data into a first machine learning model and acquire first classification information as an output of the first machine learning model;
input second data into the first machine learning model and acquire second classification information related to a classification of the second data as an output of the first machine learning model;
wherein the first machine learning model has learned a relationship between the first data and the first classification information, which indicates an attribute of the first data;
estimate, based on a predetermined estimation method, a validity relating to a combination of the second data and the second classification information;
execute predetermined processing based on an estimation result for the validity;
wherein the at least one processor is configured to acquire, based on a predetermined acquisition method, fourth classification information relating to a classification of the second data obtained from a point of view different from a point of view of the second classification information,
wherein the predetermined estimation method comprises determining whether the second classification information and the fourth classification information correspond to each other,
wherein the at least one processor is configured to determine whether the second classification information and the fourth classification information correspond to each other, and estimate the validity based on a result of the determination;
wherein the predetermined acquisition method comprises a method using a third model which has learned a relationship between the first data or fourth data and the fourth classification information on the first data or the fourth data, and
wherein the at least one processor is configured to acquire the fourth classification information based on the third model.

14. A processing execution system, comprising at least one processor configured to:
input first data into a first machine learning model and acquire first classification information as an output of the first machine learning model;
input second data into the first machine learning model and acquire second classification information related to a classification of the second data as an output of the first machine learning model;
wherein the first machine learning model has learned a relationship between the first data and the first classification information, which indicates an attribute of the first data;
estimate, based on a predetermined estimation method, a validity relating to a combination of the second data and the second classification information;
execute predetermined processing based on an estimation result for the validity;
wherein the at least one processor is configured to acquire, based on a predetermined acquisition method, fourth classification information relating to a classification of the second data obtained from a point of view different from a point of view of the second classification information,
wherein the predetermined estimation method comprises determining whether the second classification information and the fourth classification information correspond to each other,
wherein the at least one processor is configured to determine whether the second classification information and the fourth classification information correspond to each other, and estimate the validity based on a result of the determination; and wherein the at least one processor is configured to determine whether the second classification information corresponds to the fourth classification information based on a candidate group database in which a candidate group relating to the second classification information is associated with each candidate relating to the fourth classification information.

15. A processing execution system, comprising at least one processor configured to:
input first data into a first machine learning model and acquire first classification information as an output of the first machine learning model;
input second data into the first machine learning model and acquire second classification information related to a classification of the second data as an output of the first machine learning model;
wherein the first machine learning model has learned a relationship between the first data and the first classification information, which indicates an attribute of the first data;
estimate, based on a predetermined estimation method, a validity relating to a combination of the second data and the second classification information;
execute predetermined processing based on an estimation result for the validity;
wherein the at least one processor is configured to acquire, based on a predetermined acquisition method, fourth classification information relating to a classification of the second data obtained from a point of view different from a point of view of the second classification information,
wherein the predetermined estimation method comprises determining whether the second classification information and the fourth classification information correspond to each other,
wherein the at least one processor is configured to determine whether the second classification information and the fourth classification information correspond to each other, and estimate the validity based on a result of the determination;
wherein the second classification information indicates a combination of a first attribute and a first attribute value relating to the second data,
wherein the fourth classification information indicates a second attribute obtained from a point of view different from a point of view of the first attribute, and
wherein the at least one processor is configured to determine whether the first attribute indicated by the second classification information and the second attribute indicated by the fourth classification information correspond to each other.

16. A processing execution system, comprising at least one processor configured to:
input first data into a first machine learning model and acquire first classification information as an output of the first machine learning model;
input second data into the first machine learning model and acquire second classification information related to a classification of the second data as an output of the first machine learning model;
wherein the first machine learning model has learned a relationship between the first data and the first classification information, which indicates an attribute of the first data;
estimate, based on a predetermined estimation method, a validity relating to a combination of the second data and the second classification information;
execute predetermined processing based on an estimation result for the validity:
wherein the at least one processor is configured to acquire, based on a predetermined acquisition method, fourth classification information relating to a classification of the second data obtained from a point of view different from a point of view of the second classification information,
wherein the predetermined estimation method comprises determining whether the second classification information and the fourth classification information correspond to each other,
wherein the at least one processor is configured to determine whether the second classification information and the fourth classification information correspond to each other, and estimate the validity based on a result of the determination;
wherein the fourth classification information indicates classifications having a hierarchical structure, and
wherein the at least one processor is configured to estimate, when it is determined that the second classification information and the fourth classification information correspond to each other, certainty of the validity based on a hierarchical level of the fourth classification information determined to correspond to the second classification information.

* * * * *